US007924452B2

(12) United States Patent
Matsuda

(10) Patent No.: US 7,924,452 B2
(45) Date of Patent: Apr. 12, 2011

(54) IMAGE FORMING APPARATUS, CONTROL METHOD FOR IMAGE FORMING APPARATUS, IMAGE FORMING SYSTEM, AND STORAGE MEDIUM

(75) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/465,203

(22) Filed: Aug. 17, 2006

(65) Prior Publication Data
US 2007/0046996 A1 Mar. 1, 2007

(30) Foreign Application Priority Data

Aug. 26, 2005 (JP) ................................. 2005-246431

(51) Int. Cl.
G06F 3/12 (2006.01)
G06K 15/00 (2006.01)
(52) U.S. Cl. ...................... 358/1.15; 358/1.13; 358/1.18
(58) Field of Classification Search .................. None
See application file for complete search history.

(56) References Cited

U.S. PATENT DOCUMENTS

| 2002/0024685 | A1 | 2/2002 | Sasaki |
| 2002/0089542 | A1* | 7/2002 | Imamura ........................ 345/764 |
| 2002/0145770 | A1 | 10/2002 | Nomura et al. ............... 358/505 |
| 2003/0011633 | A1 | 1/2003 | Conley et al. |
| 2003/0048303 | A1 | 3/2003 | Mesa |
| 2003/0053145 | A1 | 3/2003 | Nakane ......................... 358/452 |
| 2004/0036903 | A1 | 2/2004 | Azami ........................... 358/1.13 |
| 2004/0048621 | A1 | 3/2004 | Takahashi et al. ........... 455/456.3 |
| 2005/0094178 | A1* | 5/2005 | Anno ............................ 358/1.13 |
| 2005/0174599 | A1 | 8/2005 | Ferlitsch ....................... 358/1.15 |
| 2005/0254069 | A1* | 11/2005 | Ryu et al. ........................ 358/1.1 |
| 2006/0077427 | A1* | 4/2006 | Zhang et al. ................. 358/1.15 |
| 2006/0103873 | A1* | 5/2006 | Reddy et al. ................. 358/1.15 |

FOREIGN PATENT DOCUMENTS

| EP | 0 784 294 A2 | 7/1997 |
| JP | 11-232365 A | 8/1999 |
| JP | 2000-020510 A | 1/2000 |
| JP | 2000-196698 | 7/2000 |
| JP | 2000-298561 | 10/2000 |
| JP | 2003-337810 A | 11/2003 |
| JP | 2004-288040 | 10/2004 |
| JP | 2004-312302 | 11/2004 |
| JP | 2005-158032 | 6/2005 |
| JP | 2005-169838 | 6/2005 |

OTHER PUBLICATIONS

The above references were cited in a Oct. 30, 2009 Japanese Office Action which is enclosed without English Translation that issued in Japanese Patent Application No. 2007-263802, which is a divisional of the basic Japanese Patent Application No. 2005-246631.

* cited by examiner

*Primary Examiner* — Benny Q Tieu
*Assistant Examiner* — Fan Zhang
(74) *Attorney, Agent, or Firm* — Cowan, Liebowitz & Latman, P.C.

(57) ABSTRACT

An image forming apparatus which communicates with an information processing apparatus includes a display unit which is used to input an instruction to cause the information processing apparatus to execute a dynamic layout function of dynamically determining a layout on the basis of template data so as to form an image by using template data including insertion data and layout information, a transmission unit which transmits, to the information processing apparatus, specifying information to be used when processing is performed by using the dynamic layout function, a reception unit which receives dynamically laid out data, and an output unit which outputs the received data.

15 Claims, 19 Drawing Sheets

FIG. 8

```xml
<?xml version="1.0"?>
<UIConfiguration>
  -<Components>
    <Panel id="panel_01" bkcolor="#DDDDFF" fgcolor="#FFFFFF">  ——809
    <!--SELECTION OF PRODUCT-->
    <List id="lst_01" x="100" y="175" width="300" height="150" bkcolor="#FFFFFF" multi="false">  ——810
      <DataRef>DataSource/DataSet?id=id_ds001</DataRef>  ——850
    </List>
    <!--SELECTION OF ADVERTISEMENT-->
    <List id="lst_02" x="150" y="175" width="300" height="150" bkcolor="#FFFFFF" multi="true">  ——811
      <DataRef>DataSource/DataSet?id=id_ds002</DataRef>
    </List>                                                                                      812
    <!--SELECTION OF PRINT QUALITY-->
    <Choice id="cho_01" x="300" y="175" width="300" height="150" bkcolor="#FFFFFF" >
      <DataRef>DataSource/DataSet?id=id_ds003</DataRef>
    </Choice>
    <!--DYNAMIC CONTENT / PRINT START-->
    <Button id="btn_01" x="180" y="180" width="280" height="40" >  ——813
      <Label>PRINT</Label>
      <TargetAction>act_001</TargetAction>  ——815
    </Button>
  </Panel>
  </Components>
  -<ActionMapping>
    -<Action id="act_001" name="DynamicContentsPrint" type="zzz.yyy.xxx.DynamicContentsPrint">  ——817
      -<Arguments>
        <Argument data_source_id="lst_01" key="product_code"/>  ——820
        <Argument data_source_id="lst_02" key="kind_of_adv"/>   ——821
        <Argument data_source_id="cho_01" key="print_quality_dpt"/>  ——822
      </Arguments>
    </Action>
  </ActionMapping>
</UIConfiguration>
```

```xml
<?xml version="1.0"?>
-<DataSource>
  -<DataSet id="id_ds001">
    -<Data id="id_0001">
      <Label>DIGITAL C600</Label>
      <Value key="product_code">0559B001</Value>
    </Data>
    -<Data id="id_0002">
      <Label>DIGITAL C500</Label>
      <Value key="product_code">0561B001</Value>
    </Data>
    -<Data id="id_0003">
      <Label>DIGITAL C55</Label>
      <Value key="product_code">0622A001</Value>
    </Data>
  </DataSet>
  <DataSet id="id_ds002">
    -<Data id="id_0101">
      <Label>MEMORY / SET PURCHASE</Label>
      <Value key="kind_of_adv">AdvMemory</Value>
    </Data>
    -<Data id="id_0102">
      <Label>RECOMMENDED PRINTER</Label>
      <Value key="kind_of_adv">AdvPrinter</Value>
    </Data>
  </DataSet>
  -<DataSet id="id_ds003">
    -<Data id="id_0201">
      <Label>1200 dpi</Label>
      <Value key="print_quality_dpi">1200</Value>
    </Data>
    -<Data id="id_0202">
      <Label>600 dpi</Label>
      <Value key="print_quality_dpi">600</Value>
    </Data>
  </DataSet>
</DataSource>
```

901: `-<DataSource>`
902: `-<DataSet id="id_ds001">`
903: `-<Data id="id_0001">`
904: `-<Data id="id_0002">`
905: `-<Data id="id_0003">`
900

FIG. 9B

```xml
<?xml version="1.0"?>
-<Action>
  <Name>DynamicContentsPrint</Name>
  -<Arguments>
    <Argument key="product_code">0662A001</Argument>
    <Argument key="kind_of_adv">AdvPrinter</Argument>
    <Argument key="print_quality_dpi">600</Argument>
  </Arguments>
</Action>
```

924: `<Action>`
925: `<Name>`
926: `<Arguments>`
931, 932, 933
910

FIG. 13

```xml
<?xml version="1.0"?>
<UIConfiguration>
  <Components>
    <Panel id="panel_01" bkcolor="#DDDDFF" fgcolor="#FFFFFF">
    <!--SELECTION OF DOCUMENT TYPE-->
    <List id="lst_01" x="100" y="175" width="300" height="150" bkcolor="#FFFFFF" multi="false">
      <DataRef>DataSource/DataSet?id=id_ds001</DataRef>          ─1350
    </List>
    <!--SELECTION OF SERVER REGISTRATION PROCESSING-->
    <List id="lst_02" x="150" y="175" width="300" height="150" bkcolor="#FFFFFF" multi="true">
      <DataRef>DataSource/DataSet?id=id_ds002</DataRef>
    </List>
    <!--SELECTION OF RESOLUTION-->
    <Choice id="cho_01" x="100" y="175" width="300" height="150" bkcolor="#FFFFFF" >
      <DataRef>DataSource/DataSet?id=id_ds003</DataRef>
    </Choice>
    <!--SELECTION OF CONFIRMATION IN PREVIEW WINDOW-->
    <List id="lst_03" x="100" y="175" width="300" height="150" bkcolor="#FFFFFF" multi="false">
      <DataRef>DataSource/DataSet?id=id_ds004</DataRef>
    </List>
    <!--SCAN / SERVER REGISTRATION-->
    <Button id="btn_01" x="180" y="180" width="280" height="40" >
      <Label>SCAN / REGISTRATION</Label>
      <TargetAction>act_001</TargetAction>
    </Button>
    </Panel>
  </Components>
  <ActionMapping>
    <Action id="act_001" name="ScanToRegister" type="zzz.yyy.xxx.ScanToRegister">
      <Arguments>
        <Argument data_source_id="lst_01" key="document_type"/>
        <Argument data_source_id="lst_02" key="save_option"/>
        <Argument data_source_id="cho_01" key="scan_resalution"/>
        <Argument data_source_id="lst_03" key="preview_confirm"/>
      </Arguments>
    </Action>
  </ActionMapping>
</UIConfiguration>
```

```xml
<?xml version="1.0"?>
-<DataSource>
  -<DataSet id="id_ds001">
    -<Data id="id_0001">
       <Label>RECEIPT</Label>
       <Value key="document_type">Receipt</Value>
    </Data>
    -<Data id="id_0002">
       <Label>BILL</Label>
       <Value key="document_type">Bill</Value>
    </Data>
    -<Data id="id_0003">
       <Label>DELIVERY SLIP</Label>
       <Value key="document_type">StatementOfDelivery</Value>
    </Data>
  </DataSet>
  -<DataSet id="id_ds002">
    -<Data id="id_0101">
       <Label>ELECTRONIC SIGNATURE</Label>
       <Value key="save_option">eSignature</Value>
    </Data>
    -<Data id="id_0102">
       <Label>TIME STAMP</Label>
       <Value key="save_option">TimeStamp</Value>
    </Data>
  </DataSet>
  -<DataSet id="id_ds003">
    -<Data id="id_0201">
       <Label>600 dpi</Label>
       <Value key="scan_resolution">600</Value>
    </Data>
    -<Data id="id_0202">
       <Label>300 dpi</Label>
       <Value key="scan_resolution">300</Value>
    </Data>
    -<Data id="id_0203">
       <Label>200 dpi</Label>
       <Value key="scan_resolution">200</Value>
    </Data>
  </DataSet>
  -<DataSet id="id_ds004">
    -<Data id="id_0301">
       <Label>CONFIRM</Label>
       <Value key="preview_confirm">TRUE</Value>
    </Data>
  </DataSet>
</DataSource>
```

FIG. 14B

```xml
<?xml version="1.0"?>
-<Action>
    <Name>ScanToRegister</Name>
   -<Arguments>
      <Argument key="document_type">Receipt</Argument>
      <Argument key="save_option">eSignature</Argument>
      <Argument key="save_option">TimeStamp</Argument>
      <Argument key="scan_resolution">300</Argument>
      <Argument key="preview_confirm">TRUE</Argument>
   </Arguments>
</Action>
```

FIG. 17

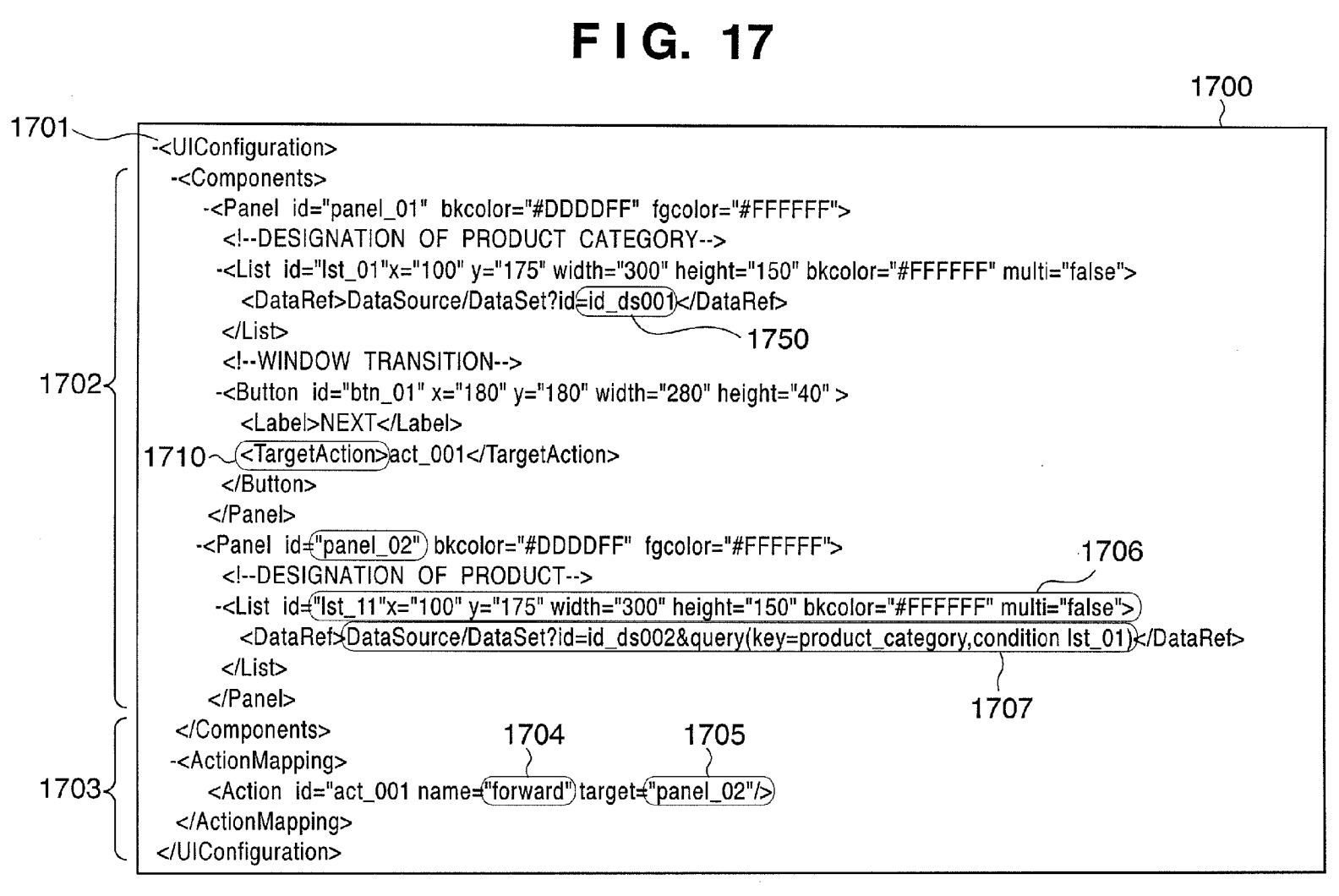

```
<UIConfiguration>                                                                               ─ 1701
  <Components>
    <Panel id="panel_01" bkcolor="#DDDDFF" fgcolor="#FFFFFF">
      <!--DESIGNATION OF PRODUCT CATEGORY-->
      <List id="lst_01" x="100" y="175" width="300" height="150" bkcolor="#FFFFFF" multi="false">
        <DataRef>DataSource/DataSet?id=id_ds001</DataRef>          ─ 1750
      </List>
      <!--WINDOW TRANSITION-->
      <Button id="btn_01" x="180" y="180" width="280" height="40" >
        <Label>NEXT</Label>
1710 ─── <TargetAction>act_001</TargetAction>
      </Button>
    </Panel>
    <Panel id="panel_02" bkcolor="#DDDDFF" fgcolor="#FFFFFF">
      <!--DESIGNATION OF PRODUCT-->
      <List id="lst_11" x="100" y="175" width="300" height="150" bkcolor="#FFFFFF" multi="false">    ─ 1706
        <DataRef>DataSource/DataSet?id=id_ds002&query(key=product_category,condition_lst_01)</DataRef>
      </List>                                                                              1707
    </Panel>
  </Components>
  <ActionMapping>
    <Action id="act_001" name="forward" target="#panel_02"/>
             1704              1705
  </ActionMapping>
</UIConfiguration>
```

```
-<DataSource>
    -<DataSet id="id_ds001">
        -<Data id="id_0001">
            <Label>DIGITAL CAMERA</Label>
            <Value key="product_category">DigitalCamera</Value>
        </Data>
        -<Data id="id_0002">
            <Label>PRINTER</Label>
            <Value key="product_category">Printer</Value>
        </Data>
        -<Data id="id_0003">
            <Label>FACSIMILE</Label>
            <Value key="product_category">Fax</Value>
        </Data>
    </DataSet>
    -<DataSet id="id_ds002">
        -<Data id="id_1001">
            <Label>DIGITAL C600</Label>
            <Value key="product_code">0559B001</Value>
            <Value key="product_category">DigitalCamera</Value>
        </Data>
        -<Data id="id_1002">
            <Label>DIGITAL C500</Label>
            <Value key="product_code">0561B001</Value>
            <Value key="product_category">DigitalCamera</Value>
        </Data>
        -<Data id="id_1003">
            <Label>DIGITAL C55</Label>
            <Value key="product_code">0622A001</Value>
            <Value key="product_category">DigitalCamera</Value>
        </Data>
        -<Data id="id_1004">
            <Label>Printer IJ300</Label>
            <Value key="product_code">0388A001</Value>
            <Value key="product_category">Printer</Value>
        </Data>
    </DataSet>
</DataSource>
```

Labels: 1800, 1801 (<DataSource>), 1802 (<DataSet id="id_ds001">), 1803 (<Data id="id_0001">), 1804 (<Data id="id_0002">), 1805 (<Data id="id_0003">), 1806 (<Data id="id_1001">), 1807 (<Data id="id_1002">), 1808 (<Data id="id_1003">), 1809 (<Data id="id_1004">)

IMAGE FORMING APPARATUS, CONTROL METHOD FOR IMAGE FORMING APPARATUS, IMAGE FORMING SYSTEM, AND STORAGE MEDIUM

BACKGROUND OF THE INVENTION

1. Field of the Invention

The present invention relates to a technique of constructing a user interface (UI) window in accordance with a user's purpose and forming an image by using a function unique to a multi function peripheral (MFP) and the function of a server application in accordance with an instruction from the UI.

2. Description of the Related Art

Recently, an application execution environment typified by a Java (registered trademark) has been provided for a multi function peripheral (MFP) (to be also simply referred to as an "image forming apparatus" hereinafter). Developing programs which operate in the Java (registered trademark) environment makes it possible to create applications using the functions of an MFP. In general, most of these applications are those called package applications in which window configurations and functions provided by MFPs are fixed.

When a solution linked with a server application which operates on a server capable of communicating with an MFP is to be provided for a user company, it is difficult to flexibly satisfy the specifications required by the user by using a package application which provides fixed window configurations and functions.

Japanese Patent Laid-Open No. 2000-298561 discloses a technique of downloading an application program for an MFP from a server and executing it. However, the contents disclosed in Japanese Patent Laid-Open No. 2000-298561 do not refer to the customization of an MFP application itself, and hence it is difficult to provide an individual solution for a user's request.

A case of a solution obtained by linking an MFP with an application on a server is a pull-type printing system in which an MFP acquires a file stored in a document management server or content server through a network and prints the file. Another case is a system in which a scanned document file created by scanning operation using an MFP is registered in a document management server or content server.

Assume that a brochure printing system to which pull-type printing is applied is to be used. In this case, an electric appliance distributor and travel agency, which belong to different categories of business, require brochure printing with different specifications. For example, the electric appliance distributor is assumed to require specifications for printing brochures for each of products such as digital cameras, whereas the travel agency is assumed to require specifications for brochures for each of destinations of travel. In such a case, the UI of an MFP issues instructions to the MFP and a server application in accordance with operations which users want to directly see, touch, and process, and hence it is difficult to satisfy a wide variety of specifications, which are assumed to be required by the users, with fixed window configurations.

Japanese Patent Laid-Open No. 2000-196698 discloses a technique of registering the correspondence relationship between a printer and a scanner as a transfer pass protocol in a server in advance and distributing the protocol by downloading it into a multi function apparatus and the like. This reference also discloses a technique of displaying, on an operation panel, an icon for virtual copy corresponding to the combination of the printer and the scanner by using the transfer pass protocol.

According to the conventional technique, an icon indicating a combination of an input device and an output device is designated to make a plurality of devices cooperate with each other, thereby executing one service. In the above conventional technique, however, the functions of a plurality of designated devices are simply executed sequentially. That is, the technique does not allow the user to make full use of various functions of external devices with which the image forming apparatus communicates and flexibly change or enhance the function of the image forming apparatus.

In addition, conventionally, it is necessary to design the layout of a form in accordance with a combination of insertion data and a template for every execution of a service. For this reason, a desired output cannot be obtained by only simple instructions from the user through the image forming apparatus.

According to one aspect of the present invention, it is an object to provide a mechanism of enhancing or customizing the function of an image forming apparatus by making full use of various functions of an external information processing apparatus with which the image forming apparatus communicates.

According to another aspect of the present invention, it is another object to provide a mechanism of obtaining a desired output by only issuing simple instructions through the display screen of an image forming apparatus in cooperation with an external device having a dynamic layout function.

SUMMARY OF THE INVENTION

In order to achieve the above objects, an image forming apparatus according to the present invention is characterized by mainly comprising the following arrangement.

In order to achieve the above described object, according to an aspect of the present invention, there is provided an image forming apparatus which communicates with an information processing apparatus, comprising:

a display unit adapted to display, on an operation unit, a window for inputting an instruction to cause the information processing apparatus to execute a dynamic layout function of dynamically determining a layout on the basis of template data so as to form an image by using template data including insertion data and layout information;

a transmission unit adapted to transmit, to the information processing apparatus, specifying information to be used when processing is performed by using the dynamic layout function of the information processing apparatus in accordance with an instruction input through a window displayed by the display unit;

a reception unit adapted to receive data dynamically laid out in the information processing apparatus by using the specifying information transmitted by the transmission unit; and an output unit adapted to output the data received by the reception unit.

Moreover, according to another aspect of the present invention, there is provided an image forming apparatus which communicates with an information processing apparatus, comprising:

an acquisition unit adapted to acquire configuration data in which information for the construction of a user interface is set;

a display unit adapted to display a window for inputting an instruction to execute image processing in which data processed by using a function of the image forming apparatus is processed by using a function of the information processing apparatus, by processing the configuration data acquired by the acquisition unit;

an execution unit adapted to execute a function of the image forming apparatus in accordance with an instruction input through the window displayed by the display unit; and a transmission unit adapted to transmit, to the information processing apparatus, data acquired when the execution unit executes the function of the image forming apparatus, and processing information to be used when the data is processed by using a function of the information processing apparatus.

A control method for an image forming apparatus according to the present invention is characterized by mainly comprising the following arrangement.

According to another aspect of the present invention, there is provided a control method for an image forming apparatus which communicates with an information processing apparatus, comprising steps of:

displaying, on an operation unit, a window for inputting an instruction to cause the information processing apparatus to execute a dynamic layout function of dynamically determining a layout on the basis of template data so as to form an image by using template data including insertion data and layout information;

transmitting, to the information processing apparatus, specifying information to be used when processing is performed by using the dynamic layout function of the information processing apparatus in accordance with an instruction input through a window displayed in the step of displaying;

receiving data dynamically laid out in the information processing apparatus by using the specifying information transmitted in the step of transmitting; and outputting the data received in the step of receiving.

Moreover, according to another aspect of the present invention, there is provided a control method for an image forming apparatus which communicates with an information processing apparatus, characterized by comprising steps of:

acquiring configuration data in which information for the construction of a user interface is set;

displaying a window for inputting an instruction to execute image processing in which data processed by using a function of the image forming apparatus is processed by using a function of the information processing apparatus, by processing the configuration data acquired in the step of acquiring;

executing a function of the image forming apparatus in accordance with an instruction input through the window display in the step of displaying; and transmitting, to the information processing apparatus, data acquired in the step of executing by executing the function of the image forming apparatus, and processing information to be used when the data is processed by using a function of the information processing apparatus.

An image forming system according to the present invention is characterized by mainly comprising the following arrangement.

According to another aspect of the present invention, there is provided an image forming system including an information processing apparatus and an image forming apparatus which communicates with the information processing apparatus and can perform processing using a function of the information processing apparatus, the image forming apparatus comprises a display unit adapted to display, on an operation unit, a window for inputting an instruction to cause the information processing apparatus to execute a dynamic layout function of dynamically determining a layout on the basis of template data so as to form an image by using template data including insertion data and layout information, and a transmission unit adapted to transmit, to the information processing apparatus, specifying information to be used when processing is performed by using the dynamic layout function of the information processing apparatus in accordance with an instruction input through a window displayed by the display unit, the information processing apparatus comprises a specifying information reception unit adapted to receive the specifying information transmitted by the transmission unit, a dynamic layout execution unit adapted to execute dynamic layout by using the specifying information, and a dynamic layout data transmission unit adapted to transmit data dynamically laid out by the dynamic layout execution unit to the image forming apparatus, and the image forming apparatus further comprises a reception unit adapted to receive the data transmitted from the dynamic layout data transmission unit, and an output unit adapted to output the data received by the reception unit.

Moreover, according to another aspect of the present invention, there is provided an image forming system including an information processing apparatus and an image forming apparatus which communicates with the information processing apparatus and can perform processing using a function of the information processing apparatus, the image forming apparatus comprises an acquisition unit adapted to acquire configuration data in which information for the construction of a user interface is set, a display unit adapted to display a window for inputting an instruction to execute image processing in which data processed by using a function of the image forming apparatus is processed by using a function of the information processing apparatus, by processing the configuration data acquired by the acquisition unit, an execution unit adapted to execute a function of the image forming apparatus in accordance with an instruction input through the window displayed by the display unit, and a transmission unit adapted to transmit, to the information processing apparatus, data acquired when the execution unit executes the function of the image forming apparatus, and processing information to be used when the data is processed by using a function of the information processing apparatus, the information processing apparatus comprises a reception unit adapted to receive the data transmitted from the transmission unit and the processing information, and an information processing function execution unit adapted to execute a function of the information processing apparatus on the basis of the data and processing information received by the reception unit, and the information processing function executing unit registers the transmitted data in a storage unit when the processing information includes control information for registration of data input by a scanner function of the image forming apparatus.

According to the present invention, a user interface window corresponding to a user's purpose is constructed, and an image can be formed by using a function unique to a multi function peripheral and the function of a server application in accordance with settings from a user interface window.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of part of UI configuration setting file expressed in an XML form;

FIGS. 9A and 9B are views showing an example of part of a UI configuration setting file expressed in an XML form;

FIG. 13 is a view showing an example of part of a UI configuration setting file expressed in an XML form;

FIGS. 14A and 14B are views showing part of a UI configuration setting file expressed in an XML form;

FIG. 17 is a view showing an example of part of a UI configuration setting file expressed in an XML form;

FIG. 18 is a view showing an example of part of a UI configuration setting file expressed in an XML form.

DESCRIPTION OF THE EMBODIMENTS

Preferred embodiments of the present invention will now be described in detail in accordance with the accompanying drawings.

First Embodiment

The first preferred embodiment of the present invention will be described below with reference to the accompanying drawings. This embodiment will exemplify pull-type printing which is realized by making an information processing apparatus (server computer) cooperate with an image forming apparatus (MFP (Multi Function Peripheral)).

(Arrangement of System)

Figure 1:
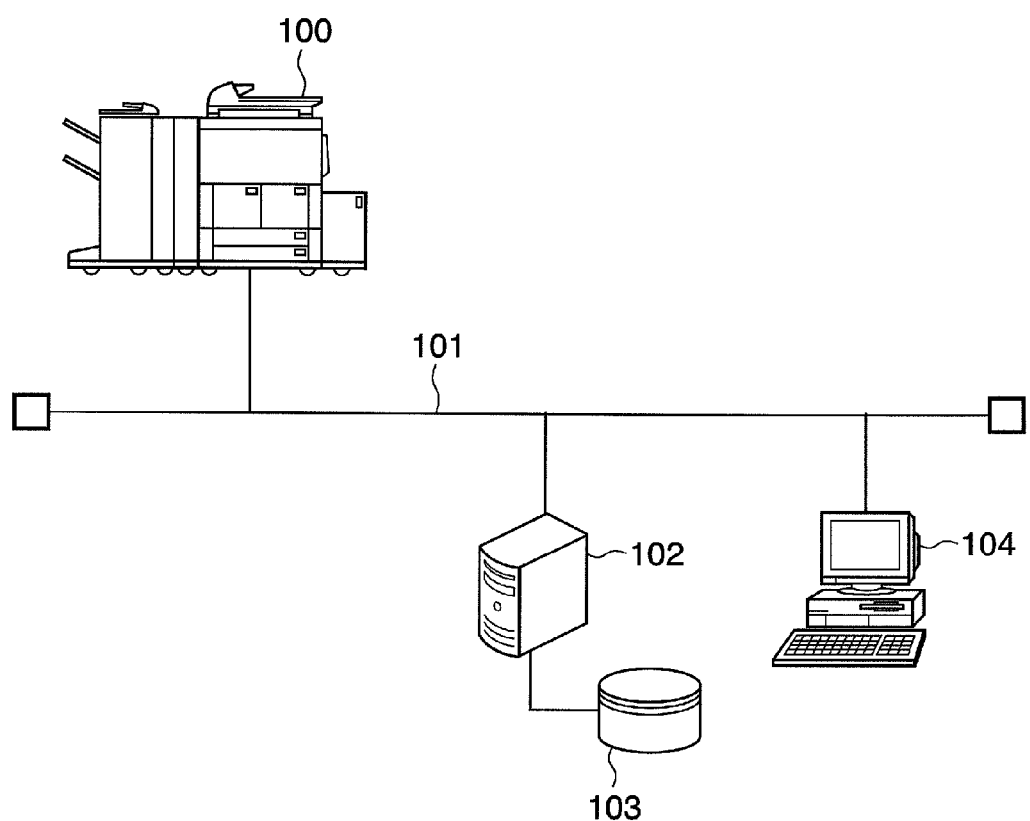
FIG. 1 is a view showing a system comprising an MFP and a server computer according to an embodiment of the present invention.

FIG. 1 is a view showing the arrangement of a system comprising an MFP and a server computer according to an embodiment of the present invention. Referring to FIG. 1, reference numeral 100 denotes an MFP to which a Java (registered trademark) environment can be applied; 101, a network; and 102, a server computer. On the server computer 102, the following operate: a program for managing communication with the MFP 100, a file creation program for constructing a UI provided for the MFP 100, a document management server, and a server application to function as a content server. Reference numeral 103 denotes a database system or file storage system functioning as a storage means (unit) which the server computer 102 can use. Various kinds of product information and their image information can be stored in the data system of the file storage system 103. When generating a catalog in accordance with an instruction from the MFP 100, the server computer 102 searches for information associated with a designated product from the database system, and can generate a catalog upon determining the layout of product information and image information on the basis of the found information. This processing is provided by the function of the server application in the server computer 102.

Reference numeral 104 denotes a client PC which is connected to the server computer 102 and is used by an operator to perform processing. For example, the operator can designate items (e.g., a product designation box, a spot advertisement box, a print quality box, and a document type box) for constructing a UI to be provided for the MFP 100 in advance through the client PC 104. A server application on the server computer 102 can create a UI configuration setting file based on the items designated by the client PC 104, and register the file in an HDD 406 (FIG. 4) of the server computer 102.

Note that designation of items for constructing a UI and creation and registration of a UI configuration setting file can be performed by using the server computer 102.

Figure 2:
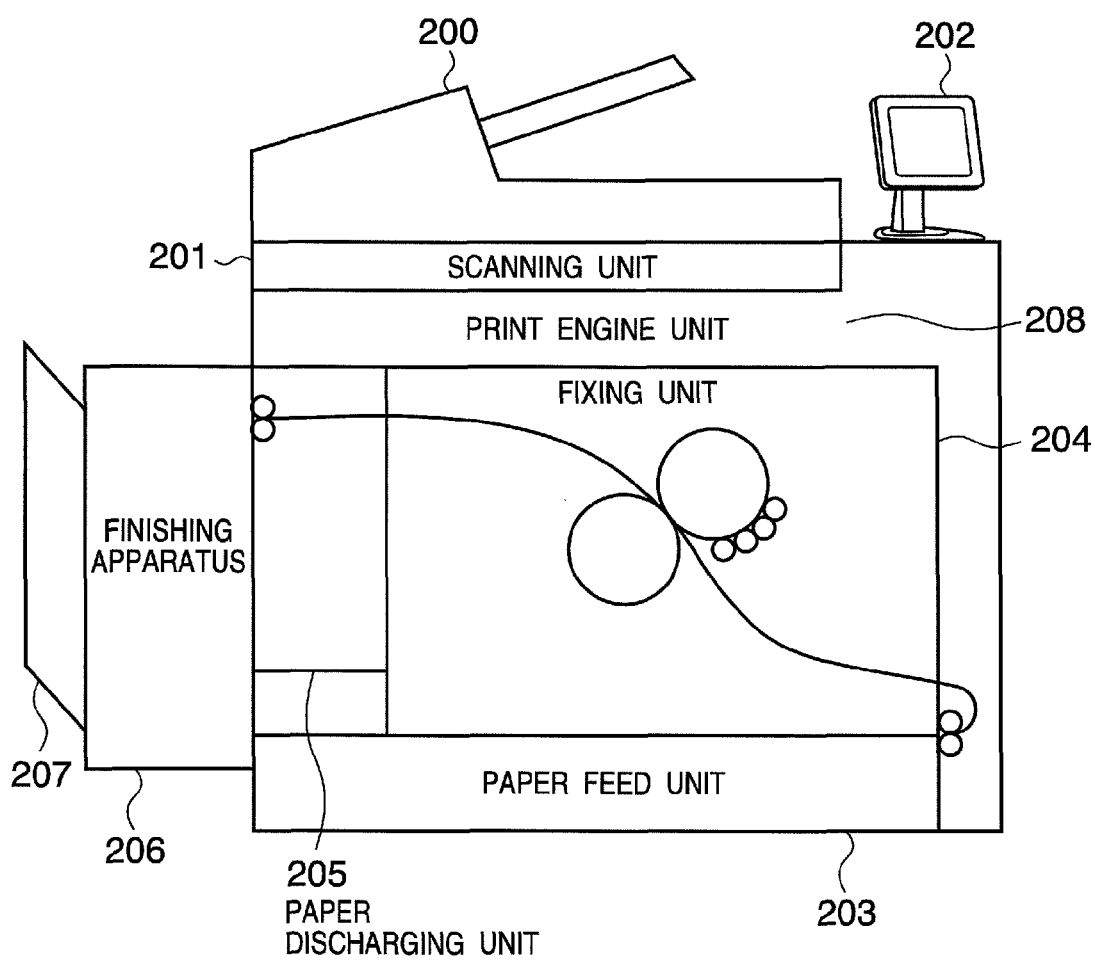
FIG. 2 is a view for explaining the detailed arrangement of the MFP.

FIG. 2 is a view for explaining the detailed arrangement of the MFP 100 shown in FIG. 1. Reference numeral 200 denotes an automatic document feeding unit (to be referred to as a "feeder" hereinafter); 201, a document scanning unit; 202, a display/touch panel unit; 203, a paper feed unit; 204, a fixing unit; 205, a paper discharge unit; 206, a finishing apparatus; 207, a paper discharge tray, and 208, a print engine unit.

(Logical Configuration of Information Processing Function in MFP 100)

Figure 3:
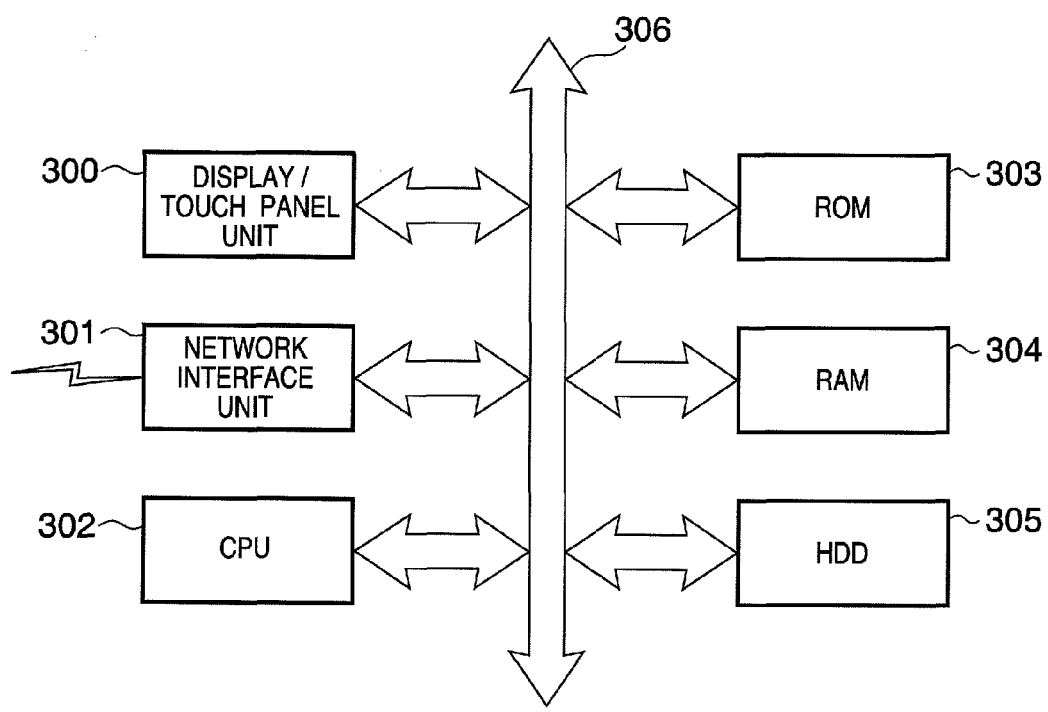
FIG. 3 is a block diagram showing the logical configuration of an information processing function in the MFP.

FIG. 3 is a block diagram showing the logical configuration of an information processing function in the MFP 100. Reference numeral 300 denotes a display/touch panel unit which provides a user interface (UI) for a user; 301, a network interface unit which communicates with an external device through the network 101; 302, a CPU which executes a program for controlling the MFP 100; 303, a ROM in which a preinstalled program and data are recorded; 304, a RAM as a memory area which can be used by a CPU and used for processing by a program; and 305, an HDD as a large-capacity storage area to which each unit is connected through an input/output interface 306.

(Logical Configuration of Information Processing Function in Sever PC and Client PC)

Figure 4:
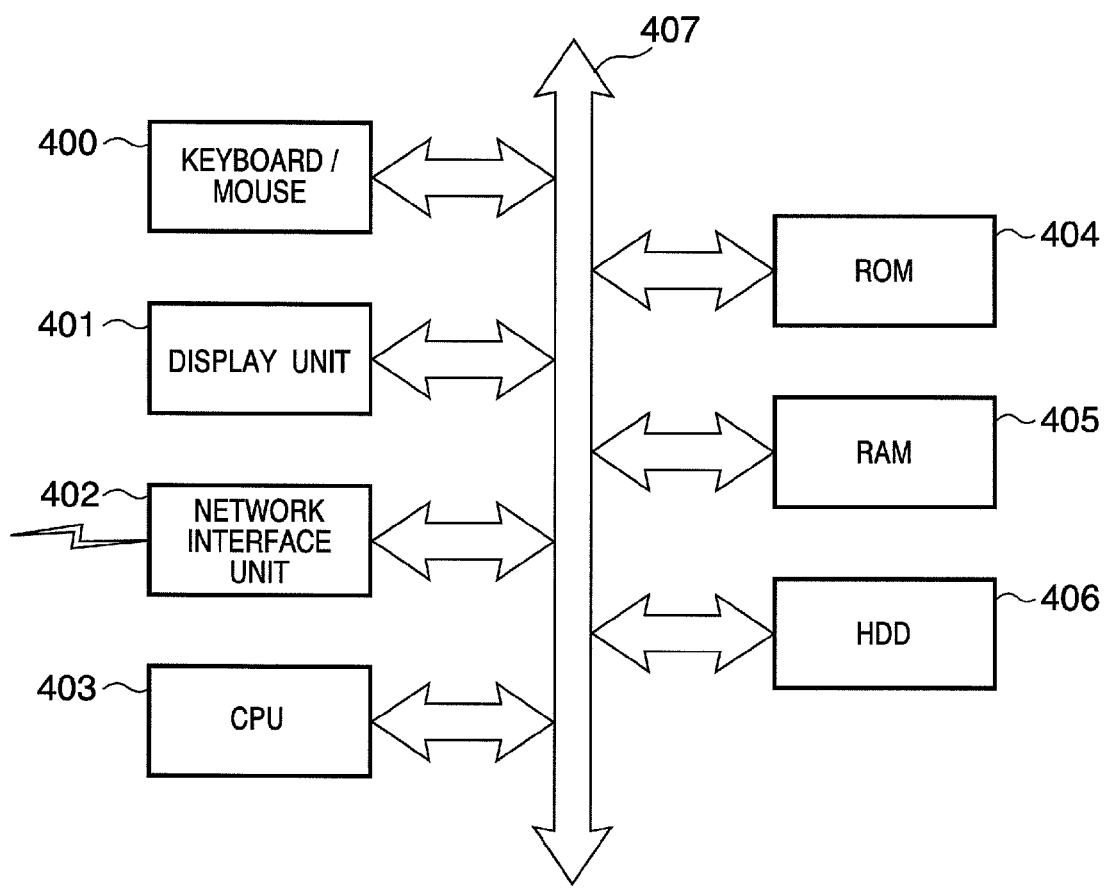
FIG. 4 is a block diagram showing the logical configuration of an information processing function in a server computer 102 and client PC 104 shown in FIG. 1.

FIG. 4 is a block diagram showing the logical configuration of an information processing function in the server computer (PC) 102 and client PC 104 shown in FIG. 1. Reference numeral 400 denotes an input control unit for a keyboard/mouse which receives inputs from a user; 401, a display unit which provides an output window for the user; 402, a network interface unit which communicates with an external device through a network; 403, a CPU which executes a control program; 404, a ROM in which a built-in application and data are recorded; 405, a RAM as a memory area which can be used by the CPU and used for processing by an application; and 406, an HDD as a large-capacity storage device to which each unit is connected through an input/output interface 407.

(Software Configuration of MFP 100)

Figure 5:
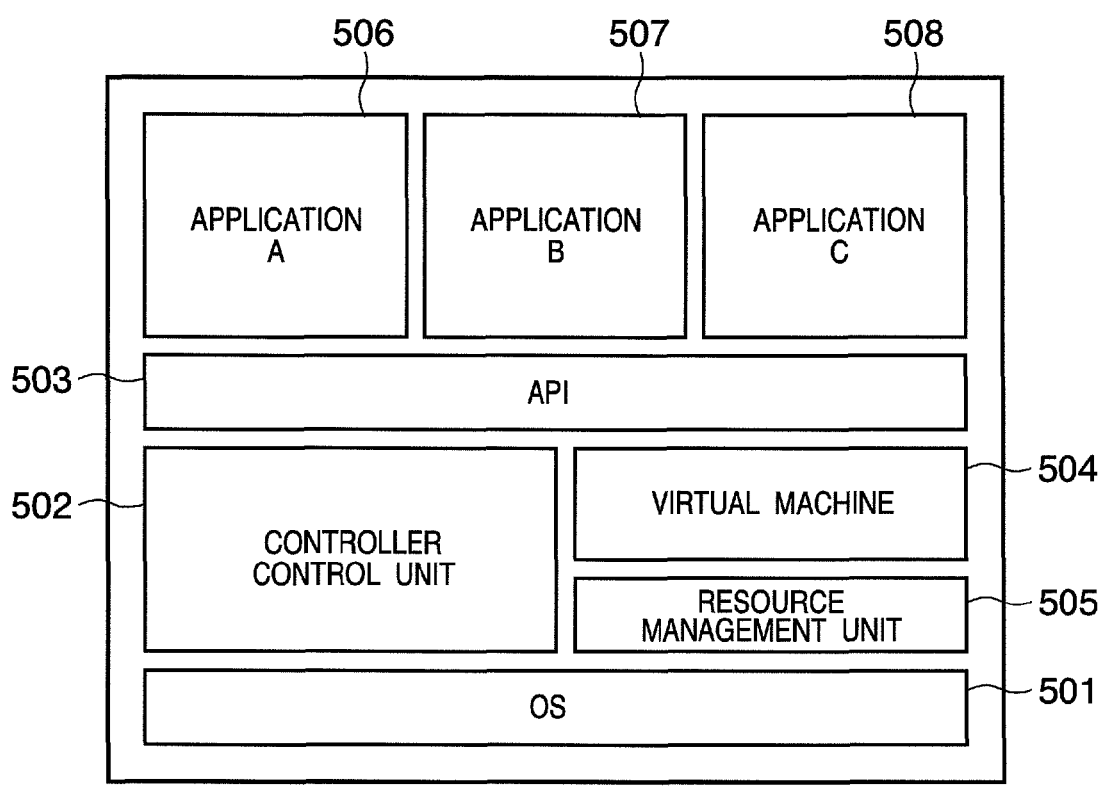
FIG. 5 is a view showing a software configuration associated with application programs which can be executed in the MFP.

FIG. 5 is a view showing a software configuration associated with an application program which can be executed in the MFP 100. The software configuration comprises each module of the real-time OS 501 which can control each type of function of the MFP 100 in real time, or libraries which can control each function of the MFP 100 by issuing instructions to the CPU 302. Each function of the MFP 100 is implemented by modules which provide interface commands to an application which operates on the MFP 100; 502, a controller control unit which operates on a real-time OS 501 and comprises modules for controlling the scanning unit 201, the print engine unit 208, a modem communication unit, a PDL rasterization unit, and the like which constitute the MFP 100; and 503, an application programming interface (to be referred to as an API hereinafter). The API 503 has a function of controlling the network interface unit 301 and processing for accessing the controller control unit 502 in response to an instruction input from an application. Reference numeral 504 denotes an optimal execution environment for the execution of a specific application and is implemented by a Java (registered trademark) virtual machine; and 505, a resource management unit which manages the resources used by the virtual machine 504 and operates on the real-time OS 501. The resource management unit 505 restricts all applications on the virtual machine 504 itself which realizes the execution environment, the API 50, or the real-time OS 501 so as to inhibit them from using resources such as a memory up to a predetermined amount or more when using the resources. Reference numerals 506, 507, and 508 denote applications which can operate in the MFP 100. Assume that in the following description, the application 506 (application A) is a target application.

(Operation Sequence Associated with UI Configurations)

Figure 6:
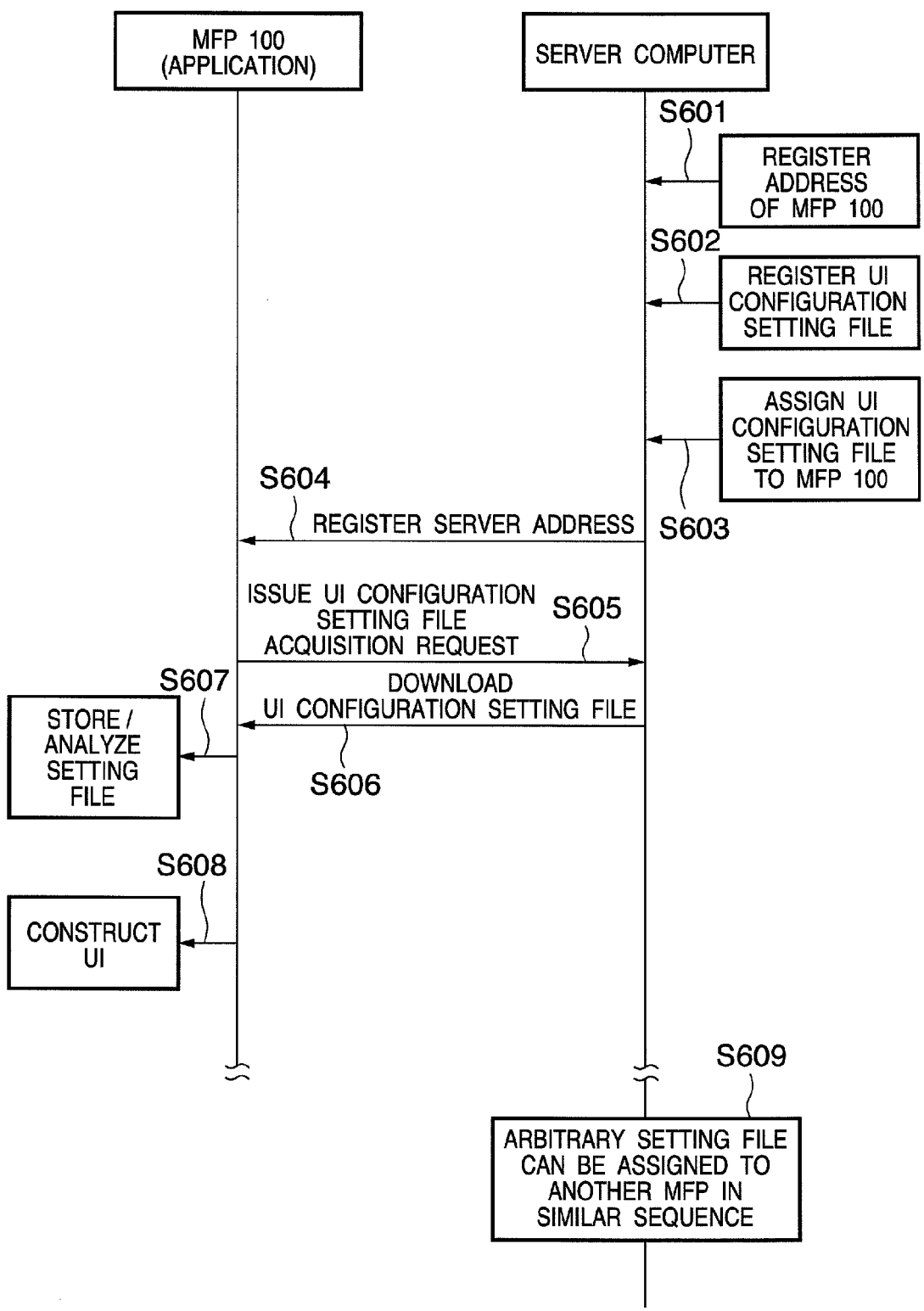
FIG. 6 is a view showing an operation sequence for constructing a customized UI.

FIG. 6 is a view showing an operation sequence for constructing a customized UI. In step S601, a manager registers the address of the MFP 100 in the server computer 102. In step S602, a UI configuration setting file is registered.

In step S603, the server computer 102 assigns the UI configuration setting file registered in step S602 to the MFP 100.

In step S604, the server computer 102 registers the server address of the server computer 102 itself in the MFP 100 in which the application 506 operates.

In step S605, the application 506 in the MFP 100 transmits a UI configuration setting file acquisition request to the server computer 102 for the server address registered in step S604.

In step S606, the server computer 102 reads out the UI configuration file assigned to the MFP 100, and the application 506 in the MFP 100 downloads the UI configuration setting file from the server computer 102.

In step S607, the application 506 stores the downloaded UI configurations setting file in the HDD 305, and analyzes the contents of the UI configuration setting file. A UI is then constructed on the basis of the analysis result (S608).

In accordance with the same sequence, the server computer 102 can register an arbitrary UI configuration setting file in another MFP and assign it thereto. In addition, another MFP can construct a user interface window corresponding to a user' purpose in accordance with the individually assigned UI configuration setting file (S609).

(Example of UI Window)

Figure 7:
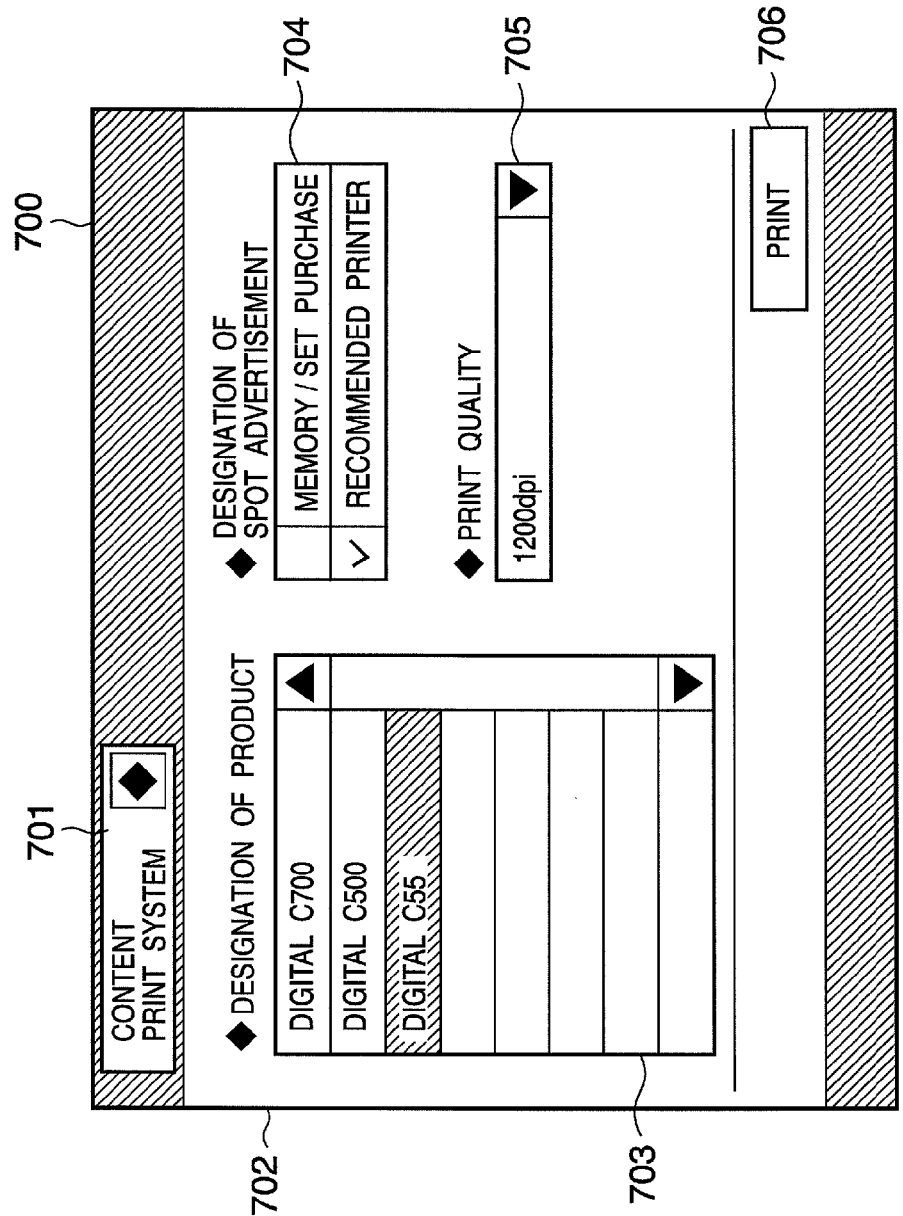
FIG. 7 is a view showing an example of a UI provided on a display/touch panel unit of the MFP by an application in the first embodiment.

FIG. 7 is a view showing an example of a UI 700 provided on the display/touch panel unit 202 of the MFP 100 by the application 506. This example of the UI 700 is aimed at the creation of an advertisement for digital cameras to be printed. Referring to FIG. 7, reference numeral 701 denotes a display/selection unit which can display an application name and select an application. When the display/selection unit 701 is selected, for example, applications which can be selected are displayed in a pull-down menu. Applications can be switched by the operation of the display/selection unit 701. Reference numeral 702 denotes a frame of the UI 700 displayed on the display/touch panel unit 202; 703, a product designation box; 704, a spot advertisement designation box; and 705, a print quality designation box. The designation boxes 703 to 705 are boxes indicating exemplary designation contents aimed at the creation of an advertisement for digital cameras. Obviously, the gist of the present invention is not limited to the display contents. Assume that each application in the MFP 100 can construct a user interface window suitable for the specifications required by a user on the basis of the contents of a UI configuration setting file corresponding to a user's purpose.

Reference numeral 706 denotes a control button for designating a print output based on the designation information file created by the server computer 102. When the control button 706 is pressed, data corresponding to a product or the like designated by each designation box (703 or 704) is sent as an argument to the server computer 102. In this case, each data sent to the server computer 102 is catalog creation information for creating a catalog. The catalog created by the server computer 102 is downloaded into the MFP 100, and printing processing is executed under the control of the CPU 302. The details of pull-type printing processing executed by the server computer 102 and the MFP 100 in cooperation with each other will be described later with reference to FIG. 11.

(Example of UI Configuration Setting File)

FIGS. 8, 9A, and 9B are views showing an example of part of a UI configuration setting file expressed in an XML (Extensible Markup Language) form. In the case of an XML 800 in FIG. 8, a root node UI Configuration (801) includes a Components node (802) and an ActionMapping node (803). In this case, the Components node (802) includes UI configuration information for constructing a UI, and information (function selection information) of an action call for executing processing designated from the UI.

UI configuration information in the Components node (802) is, for example, identification information 804 which identifies a panel element (Panel) forming a UI display in FIG. 7. Reference numeral 809 denotes attribute information for concretely specifying the display position, size, and the like of the panel. The application 506 can construct a UI by controlling the display of UI configuration elements on the basis of the identification information 804 and the attribute information 809 corresponding to the identification information 804 under the control of the CPU 302.

In the XML 800, identification information (List) 805 is described as a constituent element for the formation of a UI for a product designation box, and the display position, size, and the like of a product designation box are specified by corresponding attribute information 810. The application 506 can construct a UI by controlling the display of the product designation box in the UI under the CPU 302 on the basis of the identification information (List) 805 and the attribute information 810.

In addition, in the XML 800, identification information (List) 806 is described as a constituent element for the formation of a UI for a spot advertisement designation box, and the display position, size, and the like of a spot advertisement designation box are specified by corresponding attribute information 811. The application 506 can construct a UI by controlling the display of the spot advertisement designation box in the UI under the CPU 302 on the basis of the identification information (List) 806 and the attribute information 811.

Furthermore, identification information (Choice) 807 is described as a constituent element for the formation of a UI for a print quality designation box, and the display position, size, and the like of a print quality designation box are specified by corresponding attribute information 812. The application 506 can construct a UI by controlling the display of the print quality designation box in the UI under the CPU 302 on the basis of the identification information (Choice) 807 and the attribute information 812.

Identification information (Button) 808 is described as a constituent element of a UI which is a button element for designating the start of printing, and the display position, size, and the like of a button element are specified by corresponding attribute information 813. In label information 814, information to be displayed in addition to the button element is described. The application 506 can construct a UI by controlling the display of the button element in the UI under the CPU 302 on the basis of the identification information (Button) 808, attribute information 813, and label information 814.

Note that in the display of each constituent element, reference information such as a text to be displayed is described as a DataRef element. Assume that the application 506 can construct a UI by using reference information such as a text to be displayed in addition to the above identification information and attribute information.

An XML 900 in FIG. 9A describes the contents of reference information (DataRef element) in the XML 800 in FIG. 8. A root node DataSource (901) includes a DataSet element (902) and Data elements (903, 904, and 905). The Data elements (903, 904, and 905) described in the DataSet element (902) are referred to as display data for the construction of a UI on the basis of the reference data 850 in the XML 800.

In the XML 800 in FIG. 8, reference numeral 815 denotes a line on which an operation (Target Action) to be executed when the control button 706 is pressed (when a control event occurs) is described. As an operation to be executed at the occurrence of a control event, "act__001" is described on the line 815. When the control button 706 is pressed and a control event occurs, the attribute "id=act__001" of an action element (Action) in an ActionMapping node (803) is referred to. The attribute "id=act__001" defines a call action name (name) and the attribute (type) of the action (870). In this case, information which can be used as the attribute (type) of an action includes, for example, the function name of a program module and a URI.

An action element (Action) further includes an Arguments node and allows data selected or input by the user through the display of each designation box to be provided as an argument (820, 821, and 822).

When, for example, the user designates the item of "DIGITAL C55" in the product designation box 703, data "0622A001" corresponding to "DIGITAL C55" is provided as an argument in the XML 900 in FIG. 9A. The application 506 reads in this argument. When a transmission instruction is issued, the corresponding data is then transmitted to the dynamic layout engine of the server computer.

FIGS. 8, 9A, and 9B exemplify a UI configuration setting file. Obviously, the gist of the present invention is not limited to this configuration. The application 506 can flexibly change the configuration of the UI.

In addition, the UI configuration setting file is not limited to an XML form, and may be described in the form of, for example, a text file, binary file, or data stream.

When the UI is operated by the user, data necessary to call a function which corresponds to the operation and is unique to the MFP 100 is transferred between the Components node (802) and the ActionMapping node (803) in the UI configuration setting file. The data necessary to call the function of the server application which corresponds to the operation of the UI is transferred between the MFP 100 and the server computer 102. This makes it possible to control the function of the MFP and the function cooperated with the server application.

(Logical Configuration of Application 506)

Figure 10:
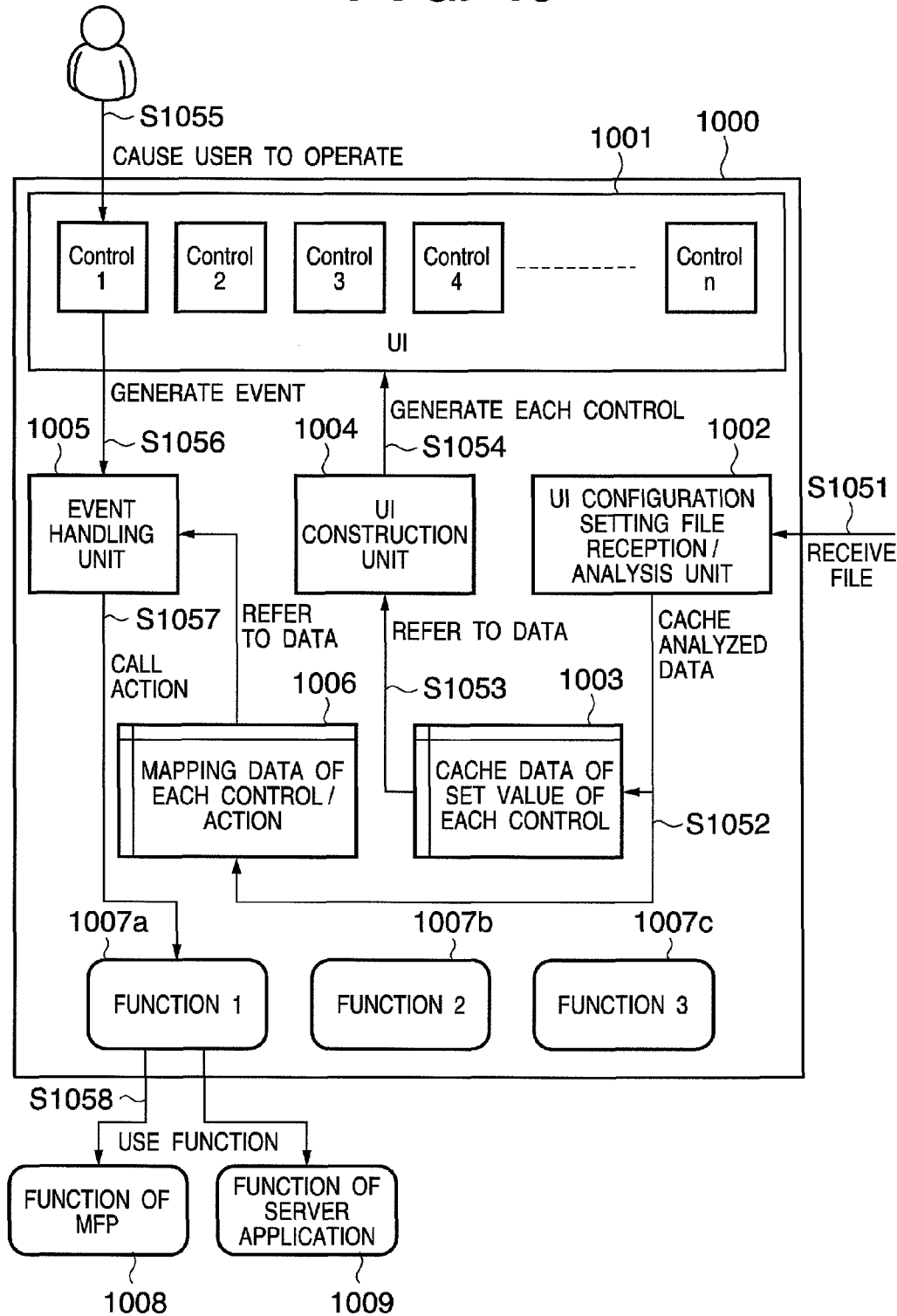
FIG. 10 is a view showing the logical configuration of an application.

FIG. 10 is a view showing the logical configuration of the application 506. Reference numeral 1000 denotes an overall application.

In step S1051, a UI configuration setting file reception/analysis unit 1002 receives the UI configuration setting file downloaded from the server computer 102 and analyzes its contents.

In step S1052, the UI configuration setting file reception/analysis unit 1002 stores the data of the analyzed UI configuration setting file in storage areas 1003 and 1006. The cache data of a set value (attribute information or the like) associated with each constituent element (control) for the construction of a UI is stored in the storage area 1003. The mapping data of an action designated from the UI is stored in the storage area 1006.

In step S1053, a UI construction unit 1004 refers to the data (identification information, attribute information, and the like) in the file storage system 103, and generates each constituent element (each control) for the construction of a UI, thereby constructing a UI 1001 (S1054). In this case, each control is generated as, for example, a constituent element 703 or 704 shown in FIG. 7. Referring to FIG. 10, n controls (Control 1, 2, 3, . . . n) are generated as constituent elements of the UI 1001.

When each constituent element (controls (Control 1, 2, 3, . . . , n)) of the constructed UI is operated and set (S1055), an event (a command corresponding to the operation and setting) is generated from the operated and set control element. This event is then notified to an event handling unit 1005 (S1056).

The event handling unit 1005 refers to the mapping data in the storage area 1006 and calls an action assigned to the corresponding control (operation/setting). Assume that the event handling unit 1005 can select a function for executing an action corresponding to a generated event, and call, for example, function modules 1007a, 1007b, and 1007c in the application 506.

For example, the function module 1007a can be configured to use a function 1008 of the MFP through an API or a function 1009 provided by a server application.

In this case, the functions of the MFP 100 include a printing function, a facsimile function, a scanning function, and the like. Assigning the respective functions to the function modules 1007a, 1007b, and 1007c makes it possible to selectively use the functions of the MFP 100.

The functions of a server application cooperated with the MFP 100 include, for example, a function of searching for data designated through the UI, creating a data layout and a file of laid out data as a print target, and downloading the file. The functions of a server application cooperated with the scanning function of the MFP 100 includes a function associated with registration processing of data input by the scanning unit 201.

(Cooperation Between MFP and Sever Computer)

An example of pull-type printing using the printing function of the MFP 100 and the data search/layout/file creation function of the server application, starting from action calling, will be described with reference to the sequence chart of FIG. 11 by taking the UI 700 in FIG. 7 as an example.

In step S1151, the user designates the model name of a digital camera, a spot advertisement, and a print quality by controls (the product designation box 703, spot advertisement designation box 704, and print quality designation box 705) using the UI 700. When the start of printing is designated from the control button 706, an event is generated, and a corresponding action is selected from the function modules 1007*a*, 1007*b*, and 1007*c* by referring to the mapping data of the action.

In step S1152, the selected function module 1007*a* is called, and processing is started. Reference numeral 910 in FIG. 9B denotes an example of a request which is notified to the function module 1007*a* and is expressed in XML. A root node Action (924) includes a name (Name) node 925 and an argument (Arguments) node 926. A function module can be called by assigning argument data to each argument element (931 to 933) following the argument node 926. The content of each argument element (931 to 933) can be identified by an attribute key in the argument element. This makes it possible to process data associated with a plurality of argument elements at once. The function module 1007*a* analyzes a call request for an action, generates a content file creation request (function request information), and transmits the request to the server application (S1153). The content of the content file creation request is based on the content of the request (FIG. 9B) notified to the function module 1007*a*.

Figure 11:
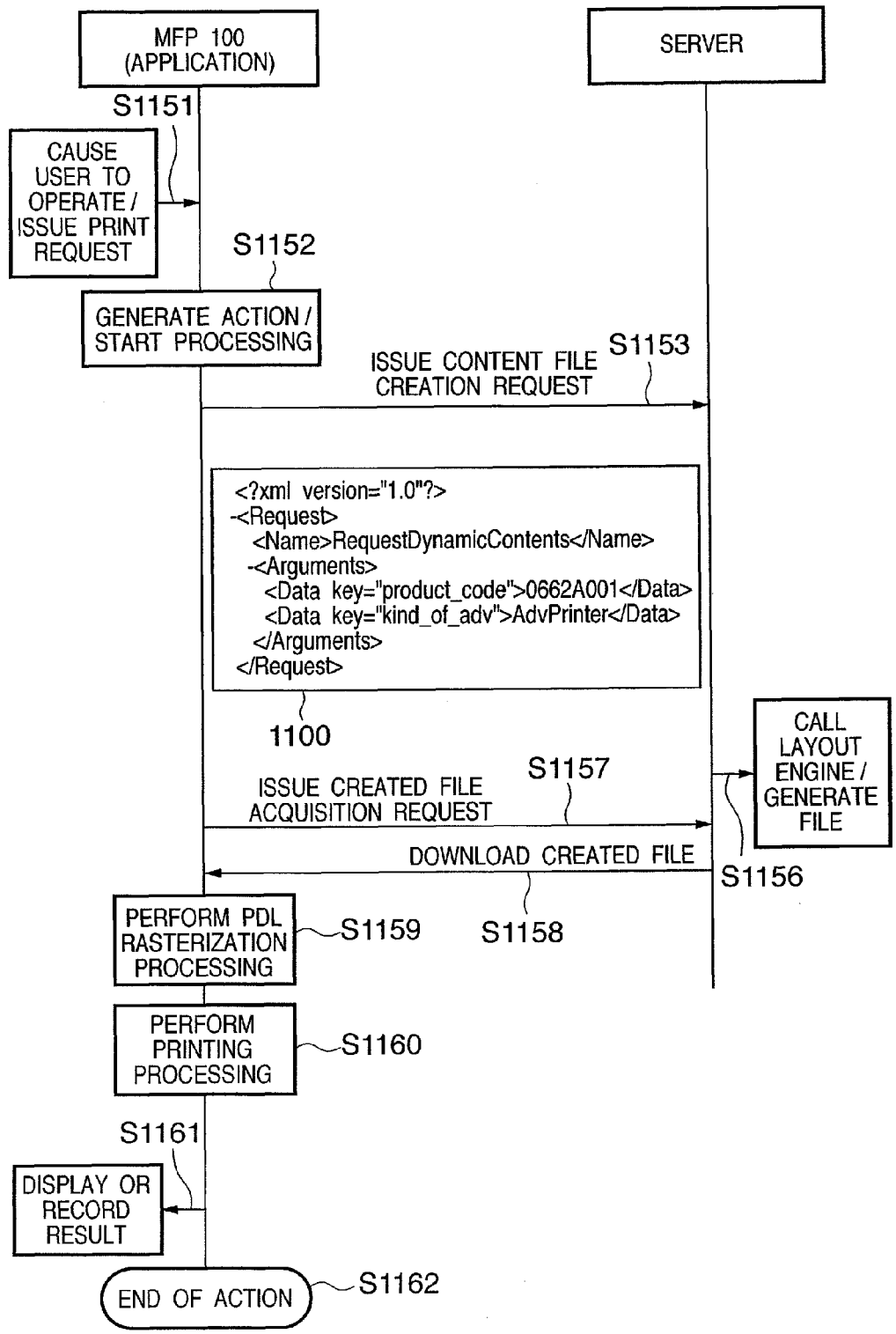
FIG. 11 is a view showing an operation sequence of an application in the first embodiment.

Reference numeral 1100 in FIG. 11 denotes an example of a content file creation request expressed in XML. A root node (Request) (1101) includes a name (Name) node (1102) and an argument (Arguments) node (1103). Argument data is assigned to each argument in the argument node (1103).

Argument data is data selected by a customized UI. This data is transferred to the server application. The server application executes data retrieval/layout/file creation function by using the transferred argument data. Consider a case wherein, for example, the model name "DIGITAL C55" is selected, and "recommended printer" is selected as the designation of a spot advertisement in FIG. 7. As described above, argument "0622A001" and spot advertisement type "AdvPrinter" are prepared as specific information in accordance with the above designation through the operation panel. When the transmission button on the operation panel is pressed, the application transmits a prepared argument to the server computer 102 to transfer it to the layout engine.

On the basis of these data, the server computer 102 calls the layout engine and automatically creates a file in which character data, image data, and the like are laid out (S1156). The details of step S1156 will be described with reference to FIG. 19.

Figure 19:
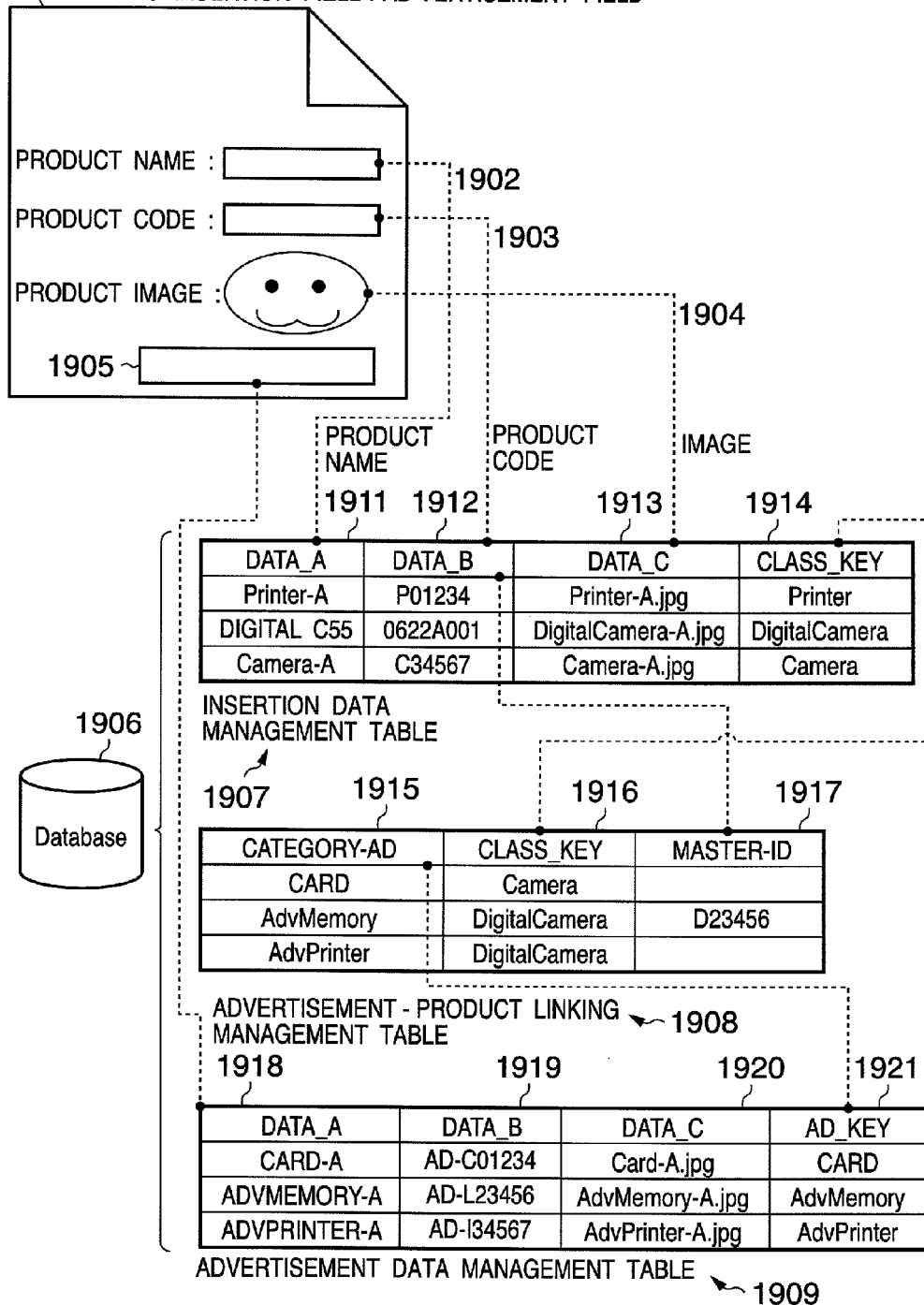
FIG. 19 is a view for explaining a technique of outputting a document having a database and an insertion field by using a layout engine.

FIG. 19 is a view for explaining a technique to which the present invention is applied and which outputs a document having a database and an insertion box by using the layout engine. Reference numeral 1901 denotes an example of a document (document template) having an insertion field and an advertisement field. The example 1901 includes a field 1902 ("insertion field A") in which "model name" data is to be inserted, a field 1903 ("insertion field B") in which "product code" data is to be inserted, a field 1904 ("insertion field C") in which "product image" data is to be inserted, and a field 1905 ("advertisement area") in which an advertisement is to be inserted, and layout information which determines reference positions where the fields are to be placed is also taken into consideration.

This file can also use PDF (Portable Document Format) as a format for electronic documents. In addition, as an electronic document format, a page description language (PDL) or the like can be used. The application 506 transmits a file acquisition request to the server application (S1157), and downloads the file created by the server application (S1158). The application 506 calls the function 1008 of the MFP through the API or the like, and performs PDL rasterization processing and printing processing (S1159 and S1160). In this case, a print quality (print_quality_dpi) provided as argument data of an XML 910 is used, and the printing function of the MFP 100 is controlled. In the case shown in FIG. 9B, since 600 dpi is set as a print quality, the printing function is controlled on the basis of this designation. When all the processing starting from action calling is complete, the completion of the processing is displayed in the UI. At this time, the log of the processing may be recorded instead of display (S1161). Upon completion of the display or recording of the result, the series of action processing is complete (S1162).

The above description has exemplified the creation of a dynamic insertion document comprising product data and advertisement data using the layout engine. However, the application range of the present invention includes the use of the arbitrary providing function of the server computer from the MFP, and is not limited to this example.

In steps S1153, S1157, and S1158 described above, the security of information can be protected by encrypting communication between the MFP 100 and the server computer 102 using an encryption means (unit).

(Display Example of UI)

Each application of the MFP 100 can construct a user interface window suitable for the specifications required by the user on the basis of the contents of a UI configuration setting file corresponding to a user's purpose. An example of a UI in a display form different from that of the UI shown in FIG. 7 will be described with reference to FIGS. 16A to 18.

Figure 16A:
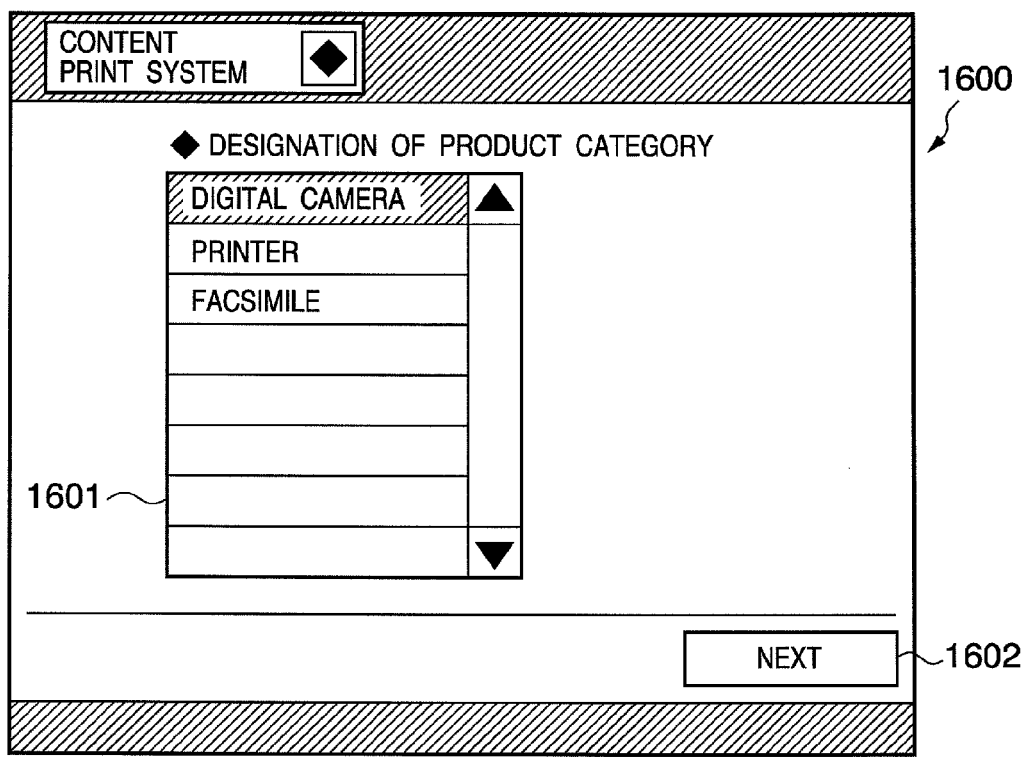
FIGS. 16A and 16B are views showing a display example of a UI.
Figure 16B:
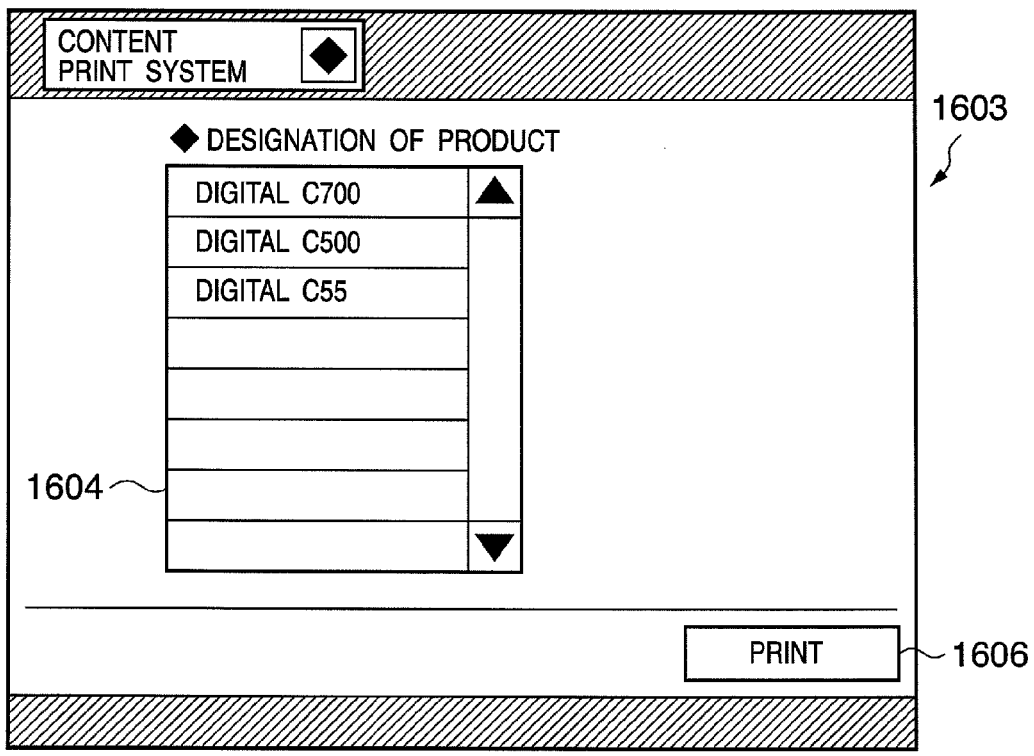

FIG. 16A is a view showing a UI 1600 for designating a product category. The user can select "digital camera", "printer", "facsimile", and the like from a designation box (1601). When the user selects "digital camera" in the UI 1600 and clicks the button control "next" (1602), the UI 1600 is switched to display a UI 1603 in FIG. 16B. FIG. 16B is a view showing the UI 1603 for the designation of a specific product in the product category (digital camera) designated in the UI 1600 described above. When the user inputs a button "print" (1606) in the UI in FIG. 16B, the flow of processing then shifts to printing processing similar to that in the case of the print in FIG. 7 described above. In addition, the application can further construct a UI following the UI in FIG. 16B on the basis of the contents of a UI configuration setting file.

FIGS. 17 and 18 are views showing examples of UI configuration setting files associated with the UI display in FIGS. 16A and 16B. In an XML 700 in FIG. 17, a root node UI Configuration (1701) includes a Components node (1702) and an ActionMapping node (1703). In this case, the Components node includes UI configuration information for the construction of a UI, and the ActionMapping node includes information (function selection information) of an action call for executing processing designated from the UI.

When the button control "next" (1602) in the UI 1600 is clicked, an event (a command corresponding to the clicking operation) is generated. The attribute "id=act_001" of an action element (Action) in the ActionMapping node described in a Target Action 1710 is referred to. In this case, the attribute and transition destination of the action element are respectively described as "forward" (window transition) (1705) and "panel_02" (next UI panel) (1705). The identification information of "panel_02" is searched from the UI configuration information, and the UI 1603 in FIG. 16B is constructed on the basis of the attribute information (1706) of a corresponding product list and reference information (1707).

An XML 1800 in FIG. 18 is designed to describe the contents of reference information (DataRef element) in the XML 1700 in FIG. 17. A root node DataSource (1801) includes a DataSet element (1802) and Data elements (1803, 1804, and 1805). Data 1803 to 1805 described in a data set 1802 are based on reference data 1750 in the XML 1700 and are referred to as display data for the construction of a UI.

In addition, the application retrieves data 1806 to 1809 of a product category matching the item designated by the user from the reference information (application retrieves data 1806 to 1809) associated with "panel_02", and displays the retrieved data in a product designation box 1604.

As shown in FIGS. 16A to 18, a user interface window can be constructed in a display form suitable for the specifications required by the user by changing the contents of the UI configuration setting file. When the button "print" (1606) in FIG. 16B is clicked, an event is generated. The flow of processing then shifts to printing processing similar to that in the case of the print in FIG. 7 described above.

According to this embodiment, a user interface window can be constructed in accordance with a user's purpose, and an image can be formed by using a function unique to the MFP and the function of a server application upon setting through the user interface window.

Second Embodiment

The second embodiment of the present invention will be described next with reference to FIGS. 12 to 15. In this embodiment, a server application registers a scanned document file obtained by using the scanning function of an MFP 100 in a file storage system 103 functioning as a storage means (unit). A description of contents which are associated with system configurations, the logical configuration of an application, and the like and are redundant to those in the first embodiment will be omitted.

Figure 12:
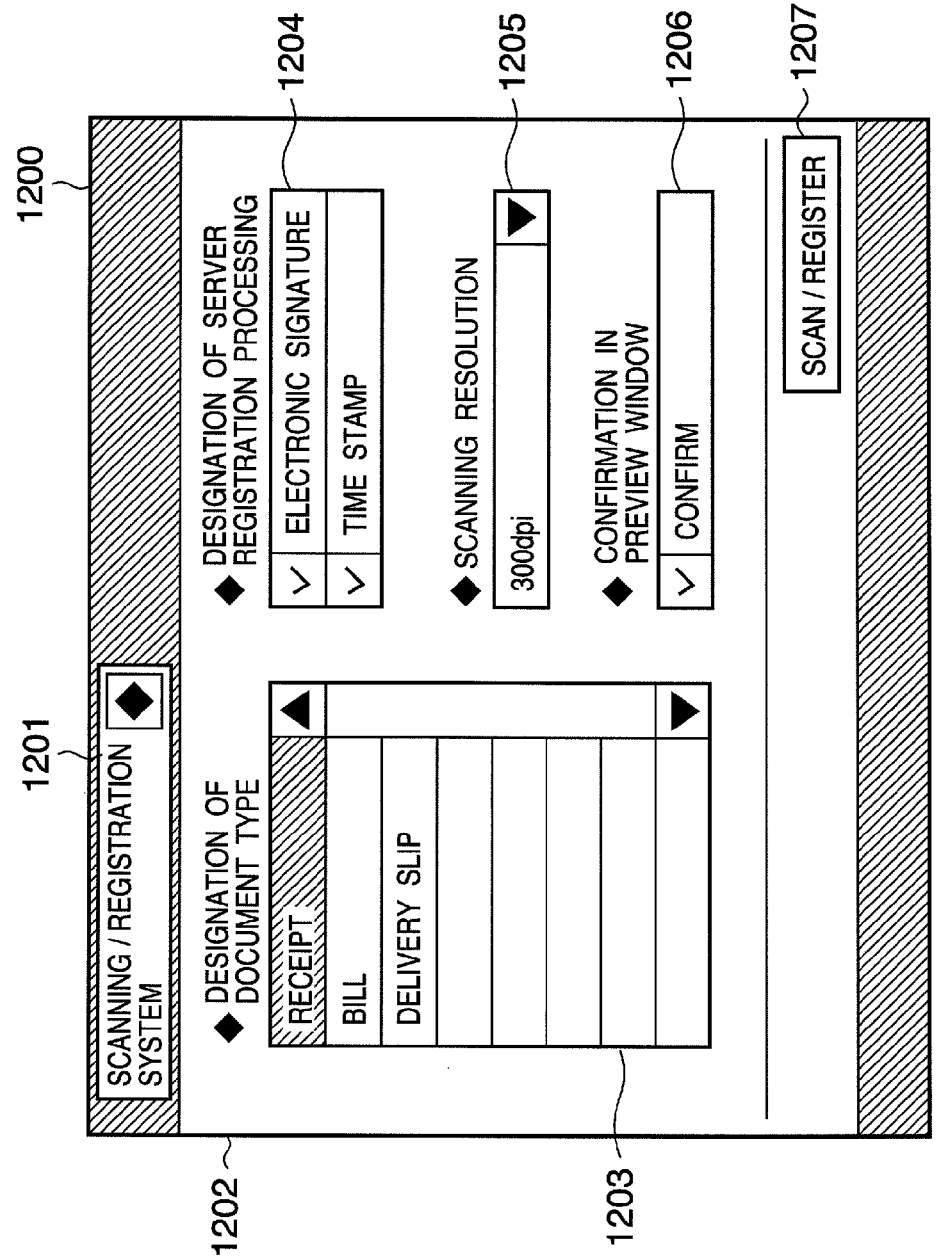
FIG. 12 is a view showing an example of a UI provided on a display/touch panel unit of an MFP by an application in the second embodiment.

FIG. 12 is a view showing an example of a UI provided on a display/touch panel unit 202 of the MFP 100 by an application 506 as in the case shown in FIG. 7 in the first embodiment. In this example of the UI, a document type designation box (1203), server registration processing designation box (1204), scanning resolution designation box (1205), and confirmation designation box (1206) on a previous image can be designated. A scanning unit 201 of the MFP 100 creates a scanned document file by scanning an original set on an original plate or a feeder 200 (FIG. 2) at a designated resolution. This scanned document file is displayed in a previous window on the display/touch panel unit 202, and is transmitted to a server computer 102 in accordance with the confirmation made by the user.

The server computer 102 then performs the registration processing designated by a UI 1200 to register the file as the data of a designated document type in the file storage system 103 functioning as a storage means (unit).

In the UI 1200 in FIG. 12, reference numeral 1201 denotes a display/section unit capable of displaying an application name and selecting an application. When the display/section unit 1201 is selected, for example, applications which can be selected are displayed in a pull-down menu. Applications can be switched with each other by operating the display/section unit 1201. Reference numeral 1202 denotes a frame of the UI 1200 which is displayed on the display/touch panel unit 202.

Reference numeral 1203 denotes a document type designation box; 1204, a server registration processing designation box; 1205, a scanning resolution designation box 1205; 1206, a designation box for determining whether to perform confirmation in a previous window; and 1207, a control button for the registration of a scanned/input document file in the server computer.

Obviously, the gist of the present invention is not limited to these display contents. Assume that each application in the MFP 100 can construct a user interface window suitable for the specifications required by a user on the basis of the contents of a UI configuration setting file corresponding to a user's purpose.

FIGS. 13, 14A, and 14B are views showing an example of part of a UI configuration setting file expressed in XML. An application in the MFP 100 can construct a UI in accordance with the contents described in the UI configuration setting file. In an XML 1300 in FIG. 13, a root node UI Configuration (1301) includes a Components node (1302) and an Action-Mapping node (1303). The Components node (1302) includes UI configuration information for the construction of a UI. The ActionMapping node (1303) includes information (function selection information) of an action call for executing processing designated from the UI.

The application in the MFP 100 can construct a UI by controlling the display of the constituent elements of the UI on the basis of identification information which identifies each constituent element and attribute information corresponding to the identification information.

In an XML 1400 in FIG. 14A, reference information in the XML in FIG. 13 (a root note DataSource (1401) as a DataRef element) includes a DataSet element (1402) and Data elements (1403, 1404, and 1405).

Buttons are defined as elements. Elements include element names and attributes. Each element can be accompanied by a sub-element. First of all, "DataSet" is an element name. DataSet has the attribute "id". A value can be assigned to the attribute. In FIG. 14A, "id=id_ds001" means that the attribute id defined as additional information of the element name DataSet takes the value "id_ds001". In addition, Data is defined as a sub-element. Data further has a Label element and a Value element as sub-elements. The character string set in the Label element as a result of analysis of XML data is used as the display name of a button. The Value element has a key as an attribute. The Key attribute is used to designate a document type. If, for example, a receipt button is pressed, the character string "Receipt" is acquired as a Key attribute by the MFP 100. The MFP 100 may transmit this acquired character string to the server computer in accordance with a transmission instruction.

An element having the attribute id_ds0102 of the Dataset element will be further described. This is associated with the server registration processing designation box 1204 for designating how data read in by the scanner is processed by the server computer. When, for example, an electronic signature element of Label is analyzed, a button including the character string of the electronic signature is displayed. The value "save option" is set for the attribute key of the value element. In addition eSignature is set as the content of the value element. When the transmission button is pressed while the electronic signature button is pressed once, the character string "eSignature" is transmitted as the value of save_option to the server computer. If the value of save_option added to the data is eSignature, the server computer performs electronic signature processing. If the value of save_option is Time_Stamp, the server computer performs time stamp processing.

The third DataSet (id attribute is id_0203) will be described next. As in the above case, a Label element is displayed as a button. The content of selected Value (numeral information selected from 600 and 200) is acquired as a selected resolution by the MFP 100. If, for example, the 300-dpi button is pressed, the MFP 100 performs scanning processing for a document at a resolution of 300 dpi.

A concrete explanation of a UI configuration setting file will be omitted because it is redundant with the explanation made with reference to FIGS. 7 and 8.

(Cooperation Between MFP and Sever Computer)

Figure 15:
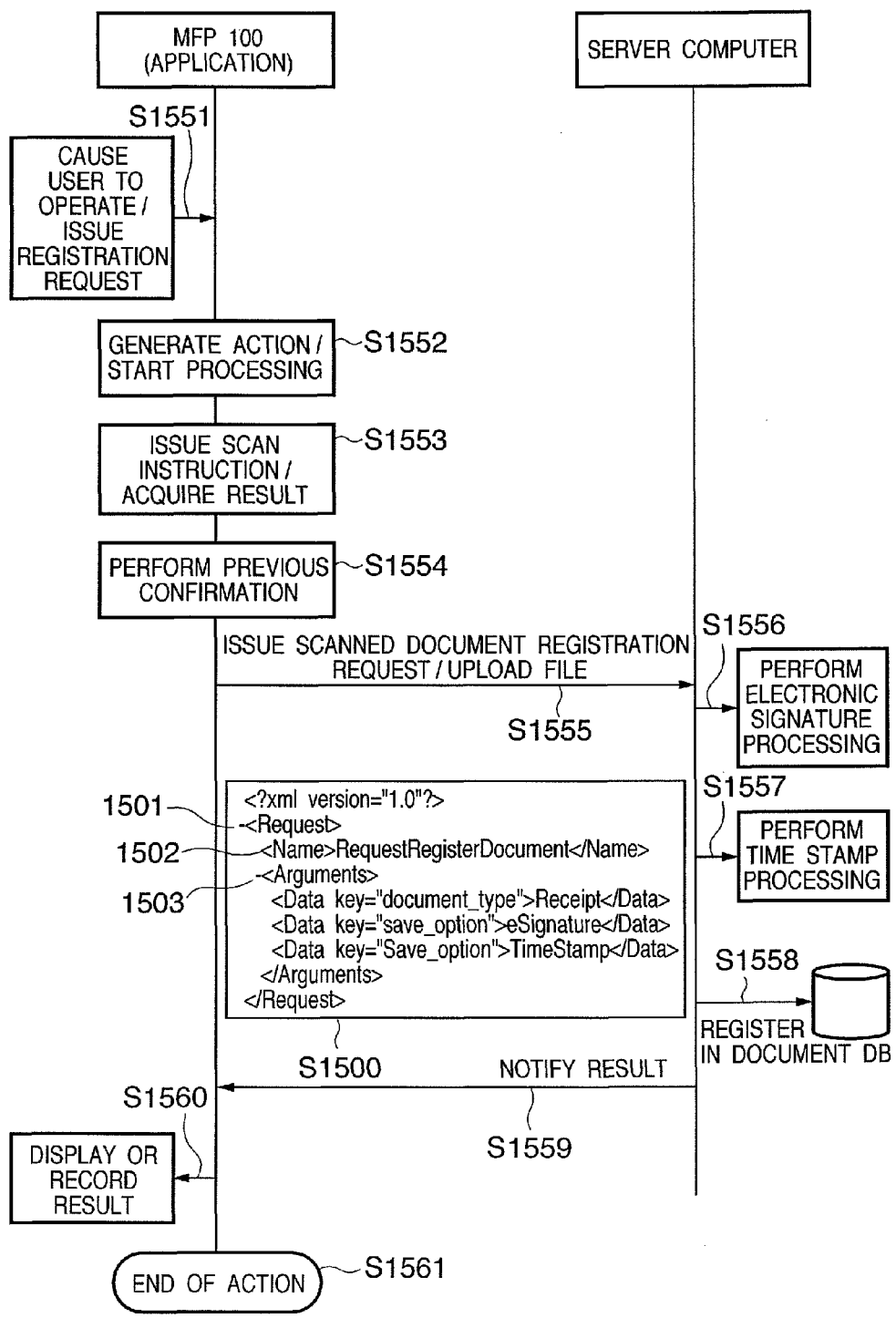
FIG. 15 is a view showing an operation sequence of an application in the second embodiment.

An example of using the scanning function of the MFP 100 and the content registration function of the server application, starting from a call for an action, will be described with reference to the sequence chart of FIG. 15 by taking the UI 1200 in FIG. 12 as an example.

In step S1551, the user designates the document type 1203, the server registration processing designation box 1204, the scanning resolution designation box 1205, and the designation box of the confirmation 1206 on a preview image by using the UI 1200. When the scanning/registration is designated with the control button 1207, an event is generated, and a corresponding action is selected from function modules 1007a, 1007b, and 1007c by referring to the mapping data of the action.

In step S1552, the selected function module (the function module 1007c corresponding to the scanning function in this case) is called, and the processing is started. Reference numeral 1410 in FIG. 14B denotes an example of a request which is notified to the function module 1007c and expressed in XML. A root node Action (1424) includes a name (Name) node 1425 and an argument (Arguments) node 1426. A function module can be called by assigning argument data to each argument element (1431 to 1435) following the argument node 1426. The content of each argument element (1431 to 1435) can be identified by an attribute key in the argument element. This makes it possible to process data associated with a plurality of argument elements at once. The function module 1007c analyzes a call request for an action, and controls the function of the MFP through an API or the like so as to scan/input an original at a designated resolution. The function module 1007c creates a scanned document file on the basis of the scanned/input data (S1553).

In step S1554, if confirmation in a preview window is designated, the application 506 displays the preview window on the display/touch panel unit 202. In addition, the application 506 displays a confirmation dialog on the display/touch panel unit 202, as needed.

In step S1555, the function module 1007c analyzes a call request for an action, generates a scanned document registration request (function request information), and transmits the request to the server application (S1555). The content of the scanned document registration request is based on the content of the request (FIG. 14B) notified to the function module 1007c.

The function module 1007c transmits the scanned document registration request to the server application on the server computer 102, and uploads the scanned document file. In this case, reference numeral 1500 denotes an example of a scanned document registration request expressed in XML. A root node (Request) (1501) includes a name (Name) node (1502) and an argument (Arguments) node (1503). Argument data is assigned to each argument in the argument node 1503.

Argument data is data selected through a customized UI. This data is transferred to the server application. The server application executes a function associated with the registration of contents by using the transferred argument data.

The server application analyzes a scanned document registration request, and detects whether registration processing (save_option), an electronic signature (eSignature), and a time stamp (TimeStamp) are designated. Since registration processing, an electronic signature, and a time stamp are designated in the scanned document registration request 1500, the server application executes electronic signal processing, time stamp processing, and registration processing for the scanned document file in accordance with the designation.

That is, the server application executes the electronic signature processing in step S1556, time stamp processing in step S1557, and registration processing with respect to a document DB in step S1558. When the file is to be registered in the document DB, the server application registers it as a receipt (Receipt) as a document type (document_type) designated by argument data.

In step S1559, when the registration processing by the server application is complete, the processing result is notified to the application 506 of the MFP 100.

In step S1560, when all the processing starting from action calling is complete, the application 506 displays the processing result in the UI. In this case, the application 506 can leave a record of the processing result so as to allow the user to check the log as well as displaying the result in the UI.

When the series of action processing is complete, the processing of the application 506 is terminated (S1561).

In steps S1555 and S1559 described above, the security of information can be protected by encrypting communication between the MFP 100 and the server computer 102 using an encryption means (unit).

According to this embodiment, a user interface window can be constructed in accordance with a user's purpose, and an image can be formed by using a function unique to a multi function peripheral and the function of a server application in accordance with settings from the user interface window.

The MFP 100 which communicates with the server computer 102 displays, on the operation unit, a window for allowing the user to input an instruction to cause the information processing apparatus to execute a dynamic layout function. In this case, the dynamic layout function is, for example, a function of dynamically determining a layout based on document template data including insertion data and layout information for laying out the insertion data so as to form an image by merging the document template.

In accordance with an instruction input through a window displayed on the operation unit (display/touch panel unit 300), specifying information to be used when processing is performed by using the dynamic layout function of the server computer 102 is transmitted to the server computer 102. As specifying information, a product code and a spot advertisement type have been described.

The server computer 102 receives the data dynamically laid out by using the specifying information. The MFP 100 outputs the received data by using the print engine.

The MFP 100 acquires configuration data in which information for the construction of a user interface is set. The MFP 100 then analyzes the configuration data. The operation unit of the MFP 100 displays a window for inputting an instruction to execute dynamic layout processing.

The MFP 100 is an apparatus which can input specifying information for specifying insertion data and template data. The MFP 100 then transmits the input specifying information.

The MFP 100 receives the data dynamically laid out by the server computer 102 on the basis of the insertion data and template data specified by the transmitted specifying information. The MFP 100 prints out the received data through the print engine.

The MFP 100 which communicates with the server computer 102 may be configured as follows. The MFP may comprise a network interface unit 301 which acquires configuration data in which information for the construction of a user interface is set. The configuration data (e.g., the data shown in FIGS. 13, 14A, and 14B) acquired through the network interface unit 301 is processed to display, on an operation unit (display/touch panel unit 300), a window for inputting an instruction to execute image processing in which the data processed by using the scanner function of the MFP 100 is processed by using the function of the server computer 102. A CPU 302 executes scanning processing in accordance with the instruction input through the window displayed on the operation unit. The MFP 100 also comprises a network interface unit 301 which transmits, to the server computer 102, the data obtained when the CPU 302 executes the scanner function of the MFP 100 and processing information (a scanned document registration request 1500) which is used to process the data by using the function of the server computer 102.

The display/touch panel unit 300 analyzes the configuration data acquired by the MFP 100 using the network interface unit 301, and displays a window for inputting an instruction to execute image processing for the data input by using the scanner of the MFP 100 by executing a program installed in the server computer 102.

In addition, the scanner function of the MFP 100 is executed under the control of the CPU 302 in accordance with an instruction input through the window displayed by the display/touch panel unit 300.

The data input when the CPU 302 executes the scanner function and a parameter or command (scanned document registration request 1500) used to perform image processing for the data by using a program installed in the server computer 102 are transmitted through the network interface unit 301. The server computer 102 receives the transmitted scanned document registration request 1500.

The server computer 102 may provide time stamp processing for adding information indicating the time. In addition, an instruction window for issuing an instruction to execute time stamp processing in the server computer 102 may be displayed on the operation unit of the MFP 100.

The processing of the scanner function of the image forming apparatus may be executed under the control of the CPU 302 in accordance with an instruction to operate the scanner which is issued through the display/touch panel unit 300.

The transmission means (unit) transmits, to the server computer 102, processing information (the scanned document registration request 1500 including the time stamp instruction) including control information set by the operation of the user interface displayed on the display/touch panel unit 300. The server computer 102 may be caused to perform time stamp processing for the image data input by the scanner function of the MFP 100 and register the resultant data.

Other Embodiment

The object of the present invention is achieved even by supplying a storage medium storing software program codes for implementing the functions of the above first and second embodiments to a system or apparatus, and causing the computer (or a CPU or an MPU) of the system or apparatus to read out and execute the program codes stored in the storage medium.

In this case, the program codes read out from the storage medium implement the functions of the above embodiments by themselves, and the storage medium storing the program codes constitutes the present invention.

As a storage medium for supplying the program codes, a flexible disk, a hard disk, an optical disk, a magneto optical disk, a CD-ROM, a CD-R, a magnetic tape, a nonvolatile memory card, a ROM, or the like can be used.

The functions of the described embodiments are implemented not only when the readout program codes are executed by the computer but also when the operating system running on the computer performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246431, filed on Aug. 26, 2005, which is hereby incorporated by reference herein in its entirety.

What is claimed is:

1. An image forming apparatus which has a print unit and a sheet supply unit, and communicates with an information processing apparatus, comprising:

a display unit adapted to display, on an operation unit, a window for inputting an instruction to cause the information processing apparatus to execute a dynamic layout function of dynamically determining a layout on the basis of template data so as to form an image by using template data including insertion data and layout information, wherein a designation item for designating a print quality, a designation item for designating a product name, and a designation item for designating a spot advertisement are included in the window;

a transmission control unit adapted (i) to transmit, to the information processing apparatus, specifying information for specifying the insertion data, which is input through the window displayed by the display unit, and is used when the dynamic layout function of the information processing apparatus is performed by using the insertion data stored in the database of the information processing apparatus and layout information for laying out the insertion data in accordance with an instruction input through a window displayed by said display unit, and (ii) not to transmit, to the information processing apparatus, information indicating the print quality which is designated by the designation item input through the window displayed by said display unit, and is used when output process is executed by said print unit, wherein the designated product name and the designated spot advertisement are included in the specifying information;

a reception unit adapted to receive contents data dynamically laid out in the information processing apparatus by using the specifying information transmitted by said transmission control unit, wherein the contents data is generated by layout processing of the information processing apparatus based on an insertion data management table, an advertisement-product linking management table, an advertisement data management table, the designated product name, and the designated spot advertisement, wherein the contents data includes the product name, the product code, the product image, information related to the designated spot advertisement, wherein in the insertion management table, a product name, a product code, a product image, and a product classification are registered, wherein in the advertisement-product linking management table, the product classification and a product category for the advertisement related to the product classification are registered, and wherein in the advertisement data management table, a product name for the advertisement, a product code for the advertisement, a product image for the advertisement, and the product category for the advertisement are registered; and a control unit adapted to control said print unit, based on the information indicating the print quality, in order to output the contents data received by said reception unit, wherein the dynamic layout depends on a data amount of insertion data to be inserted, and a layout of the insertion data is dynamically determined by depending on the data amount of the insertion data to be inserted.

2. The apparatus according to claim 1, further comprising an acquisition unit adapted to acquire configuration data in which information for the construction of a user interface is set, wherein said display unit displays a window for inputting an instruction to execute dynamic layout on an operation unit by analyzing the configuration data acquired by said acquisition unit.

3. The apparatus according to claim 1, further comprising an input adapted to input specifying information for specifying insertion data and form data, wherein said transmission control unit transmits the specifying information input by said input unit, said reception unit receives data dynamically laid out by said information processing apparatus on the basis of the insertion data and form data specified by using the specifying information transmitted by said transmission control unit, and said control unit outputs the data received by said reception unit.

4. The apparatus according to claim 2, further comprising a selection unit adapted to select functions of the information processing apparatus, wherein the configuration data includes function selection information for executing processing designated from said user interface, and said selection unit selects functions of the information processing apparatus and image forming apparatus which correspond to a setting in said user interface on the basis of the function selection information.

5. The apparatus according to claim 4, wherein in a case where a printing function of the image forming apparatus is to be used, said selection unit causes the information processing apparatus to search for data and create a file on the basis of the search result in accordance with the specifying information transmitted by said transmission control unit.

6. The apparatus according to claim 5, further comprising an image forming unit adapted to execute the printing function, wherein said reception unit acquires data dynamically laid out by the information processing apparatus from the information processing apparatus, and said image forming unit processes the data acquired by said reception unit, in accordance with the selected printing function of the image forming apparatus.

7. A control method for an image forming apparatus which has a print unit and a sheet supply unit, and communicates with an information processing apparatus, comprising steps of:

displaying, on an operation unit, a window for inputting an instruction to cause the information processing apparatus to execute a dynamic layout function of dynamically determining a layout on the basis of template data so as to form an image by using template data including insertion data and layout information, wherein a designation item for designating a print quality, a designation item for designating a product name, and a designation item for designating a spot advertisement are included in the window;

controlling transmitting by (i) transmitting to the information processing apparatus, specifying information for specifying the insertion data, which is input through the window displayed in the step of displaying, and is used when the dynamic layout function of the information processing apparatus is performed by using the insertion data stored in the database of the information processing apparatus and layout information for laying out the insertion data in accordance with an instruction input through a window displayed in the step of displaying, and by (ii) not transmitting, to the information processing apparatus, information indicating the print quality which is designated by the designation item input through the window displayed in said step of displaying, and is used when output process is executed by said print unit, wherein the designated product name and the designated spot advertisement are included in the specifying information;

receiving contents data dynamically laid out in the information processing apparatus by using the specifying information transmitted in the step of controlling transmitting, wherein the contents data is generated by layout processing of the information processing apparatus based on an insertion data management table, an advertisement-product linking management table, an advertisement data management table, the designated product name, and the designated spot advertisement, wherein the contents data includes the product name, the product code, the product image, information related to the designated spot advertisement, wherein in the insertion management table, a product name, a product code, a product image, and a product classification are registered, wherein in the advertisement-product linking management table, the product classification and a product category for the advertisement related to the product classification are registered, and wherein in the advertisement data management table, a product name for the advertisement, a product code for the advertisement, a product image for the advertisement, and the product category for the advertisement are registered; and controlling said print unit based on the information indicating the print quality, in order to output the contents data received in the step of receiving, wherein the dynamic layout depends on a data amount of insertion data to be inserted, and a layout of the insertion data is dynamically determined by depending on the data amount of the insertion data to be inserted.

8. The method according to claim 7, further comprising a step of acquiring configuration data in which information for the construction of a user interface is set, wherein in the step of displaying, a window for inputting an instruction to execute dynamic layout is displayed on an operation unit by analyzing the configuration data acquired in the step of acquiring.

9. The method according to claim 7, further comprising a step of inputting specifying information for specifying insertion data and form data, wherein in the step of controlling transmitting, the specifying information input in the step of inputting is transmitted, in the step of receiving, data dynamically laid out by the information processing apparatus on the basis of the insertion data and form data specified by using the specifying information transmitted in the step of controlling transmitting is received, and in the step of controlling, the data received in the step of receiving is output.

10. The method according to claim 8, further comprising a step of selecting functions of the information processing apparatus, wherein the configuration data includes function selection information for executing processing designated from the user interface, and in the step of selecting, functions of the information processing apparatus and image forming apparatus which correspond to a setting in the user interface are selected on the basis of the function selection information.

11. The method according to claim 10, wherein in a case where a printing function of the image forming apparatus is to be used, in the step of selecting, the information processing apparatus is caused to retrieve data and create a file on the basis of the retrieval result in accordance with the specifying information transmitted in the step of controlling transmitting.

12. The method according to claim 11, further comprising a step of forming an image by executing the printing function, wherein in the step of receiving, data dynamically laid out by the information processing apparatus is acquired from the information processing apparatus, and in the step of forming, the data acquired in the step of receiving is processed in accordance with the selected printing function of the image forming apparatus.

13. A program stored in a non-transitory computer-readable storage medium causing a computer to execute a control method for an image forming apparatus defined in claim 7.

14. A non-transitory computer-readable storage medium storing a program defined in claim 13.

15. An image forming system including an information processing apparatus and an image forming apparatus which has a print unit and a sheet supply unit, and communicates with said information processing apparatus and can perform processing using a function of said information processing apparatus, said image forming apparatus comprises:

a display unit adapted to display, on an operation unit, a window for inputting an instruction to cause said information processing apparatus to execute a dynamic layout function of dynamically determining a layout on the basis of template data so as to form an image by using template data including insertion data and layout information, wherein a designation item for designating a print quality, a designation item for designating a product name, and a designation item for designating a spot advertisement are included in the window, and a transmission control unit adapted (i) to transmit, to said information processing apparatus, specifying information for specifying the insertion data, which is input through the window displayed by the display unit, and is used when the dynamic layout function of the information processing apparatus is performed by using the insertion data stored in the database of the information processing apparatus and layout information for laying out the insertion data in accordance with an instruction input through a window displayed by said display unit, and (ii) not to transmit, to the information processing apparatus, information indicating the print quality which is designated by the designation item input through the window displayed by said display unit, and is used when output process is executed by said print unit, wherein the designated product name and the designated spot advertisement are included in the specifying information, said information processing apparatus comprises:

a specifying information reception unit adapted to receive the specifying information transmitted by said transmission unit, a dynamic layout execution unit adapted to execute dynamic layout by using the specifying information, and a dynamic layout data transmission unit adapted to transmit data dynamically laid out by said dynamic layout execution unit to said image forming apparatus, and said image forming apparatus further comprises:

a reception unit adapted to receive the contents data transmitted from said dynamic layout data transmission control unit wherein the contents data is generated by layout processing of the information processing apparatus based on an insertion data management table, an advertisement-product linking management table, an advertisement data management table, the designated product name, and the designated spot advertisement, wherein the contents data includes the product name, the product code, the product image, information related to the designated spot advertisement, wherein in the insertion management table, a product name, a product code, a product image, and a product classification are registered, wherein in the advertisement-product linking management table, the product classification and a product category for the advertisement related to the product classification are registered, and wherein in the advertisement data management table, a product name for the advertisement, a product code for the advertisement, a product image for the advertisement, and the product category for the advertisement are registered, and a control unit adapted to control said print unit, based on the information indicating the print quality, in order to output the contents data received by said reception unit, wherein the dynamic layout depends on a data amount of insertion data to be inserted, and a layout of the insertion data is dynamically determined by depending on the data amount of the insertion data to be inserted.

* * * * *